(12) United States Patent
Kim

(10) Patent No.: US 12,473,418 B2
(45) Date of Patent: Nov. 18, 2025

(54) METHOD OF MANUFACTURING FOR TEREPHTHALIC ACID USING POLYETHYLENE TEREPHTHALATE WITH HIGH DEGREE OF POLYMERIZATION MORE THAN 0.75 DL/G OF INTRINSIC VISCOSITY

(71) Applicant: Yong-Bum Kim, Seoul (KR)

(72) Inventor: Yong-Bum Kim, Seoul (KR)

( * ) Notice: Subject to any disclaimer, the term of this patent is extended or adjusted under 35 U.S.C. 154(b) by 673 days.

(21) Appl. No.: 17/836,385

(22) Filed: Jun. 9, 2022

(65) Prior Publication Data

US 2023/0107495 A1    Apr. 6, 2023

(30) Foreign Application Priority Data

Sep. 28, 2021   (KR) .................. 10-2021-0127706

(51) Int. Cl.
    *C08J 11/16*    (2006.01)
(52) U.S. Cl.
    CPC ............ *C08J 11/16* (2013.01); *C08J 2367/02* (2013.01)
(58) Field of Classification Search
    USPC ....................................................... 521/48.5
    See application file for complete search history.

(56) References Cited

FOREIGN PATENT DOCUMENTS

EP    0 597 751 B1    1/1998

OTHER PUBLICATIONS

Spaseska, D., and M. Civkaroska. "Alkaline hydrolysis of poly (ethylene terephthalate) recycled from the postconsumer soft-drink bottles." Journal of the university of chemical technology and metallurgy 45.4 (2010): 379-384. (Year: 2010).*

* cited by examiner

*Primary Examiner* — Terressa Boykin
(74) *Attorney, Agent, or Firm* — Birch, Stewart, Kolasch & Birch, LLP

(57) ABSTRACT

The present invention relates to a method for production of terephthalic acid using high polymerization degree polyethylene terephthalate, which includes: (i) introducing high polymerization degree polyethylene terephthalate having an intrinsic viscosity of 0.75 dl/g or more into a continuous reactor, and then heating and pressurizing the same to prepare a fluidal polyethylene terephthalate; (ii) introducing a mixed slurry prepared by mixing an alkaline material containing an alkali-metal, a weak acid salt of the alkali-metal and ethylene glycol together into an internal position of the continuous reactor, through which the fluidal polyethylene terephthalate passes, and implementing neat reaction of the fluidal polyethylene terephthalate with the mixed slurry in the continuous reactor to prepare alkali-metal terephthalate; and (iii) dissolving the prepared alkali-metal terephthalate in water, removing foreign substances through filtration and centrifugation, adding acid to the alkali-metal terephthalate dissolved in water and reacting the same, thereby producing terephthalic acid.

7 Claims, 20 Drawing Sheets
(18 of 20 Drawing Sheet(s) Filed in Color)

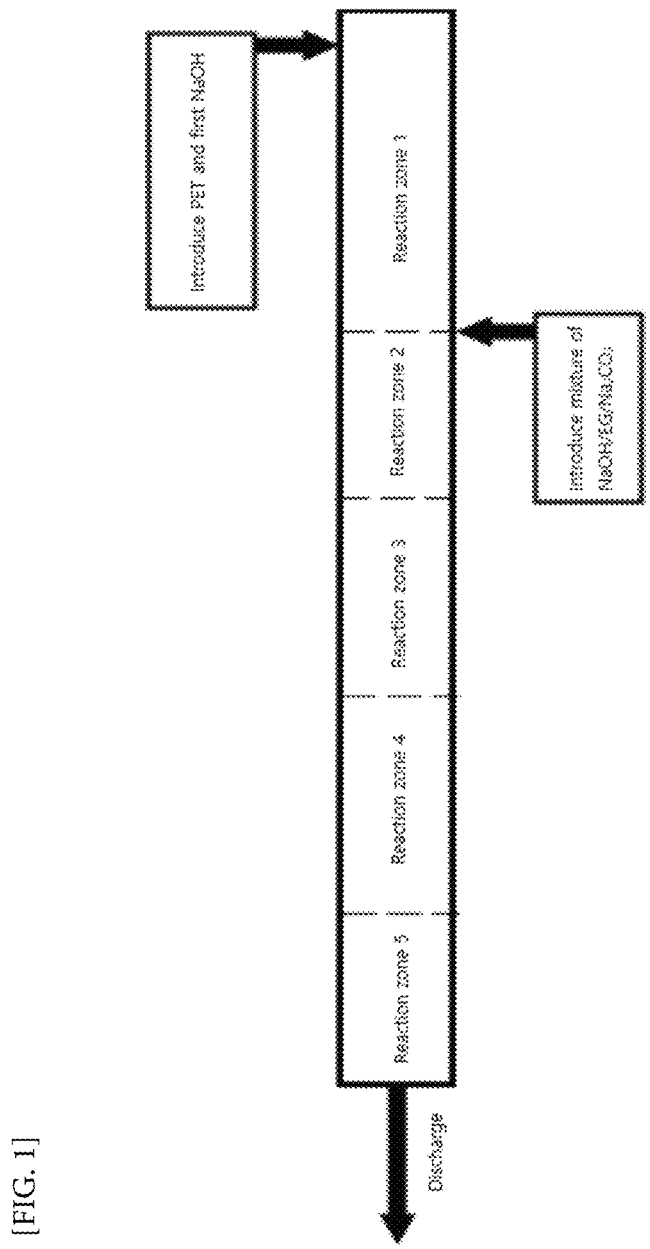
[FIG. 1]

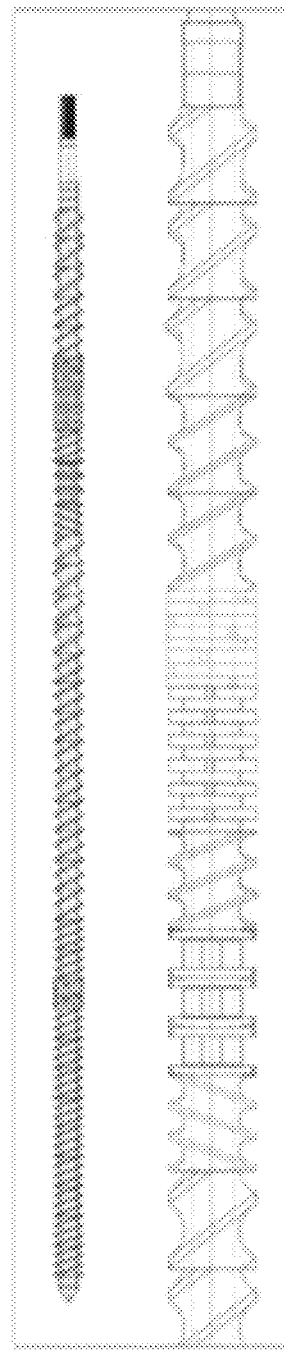
[FIG. 2]

[FIG. 3]
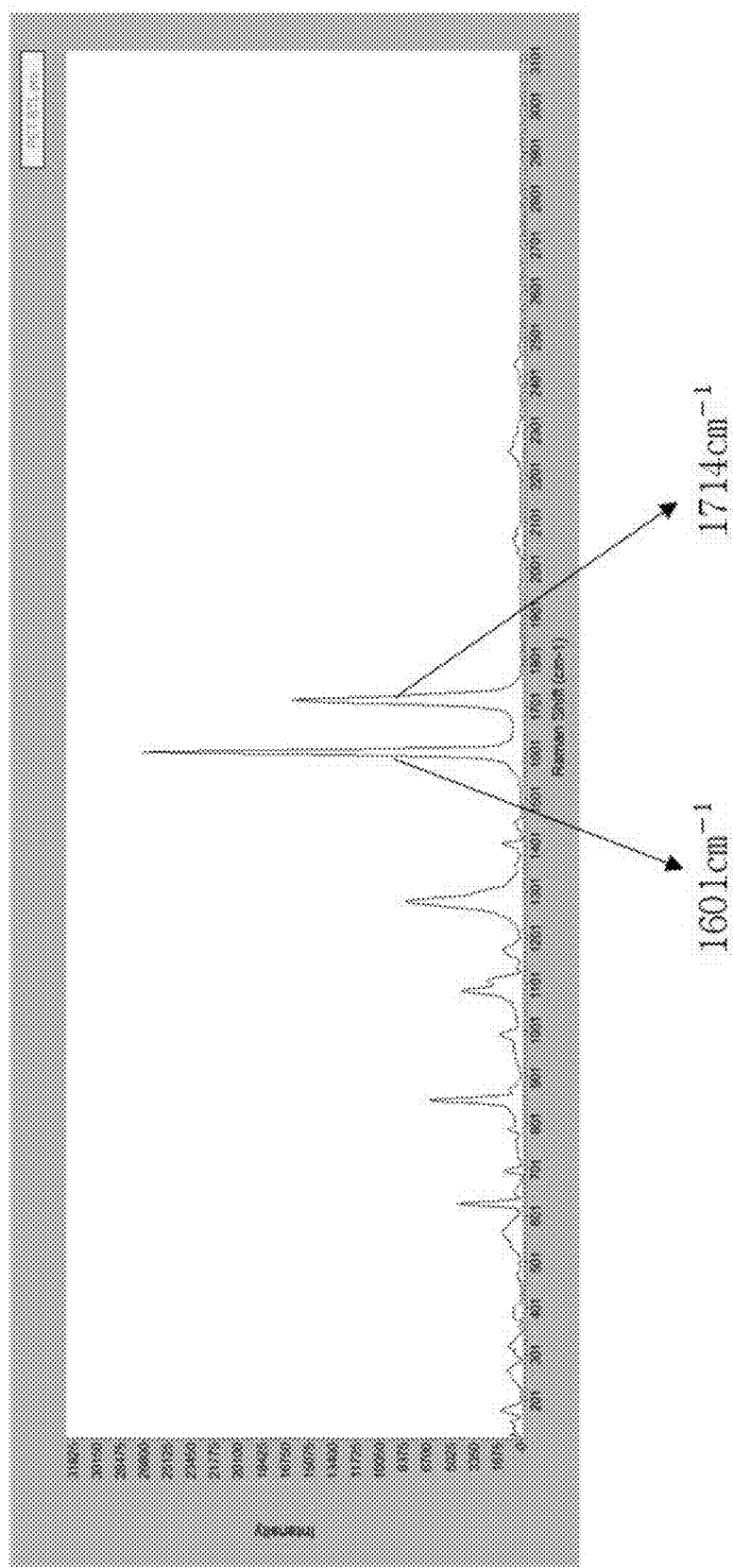

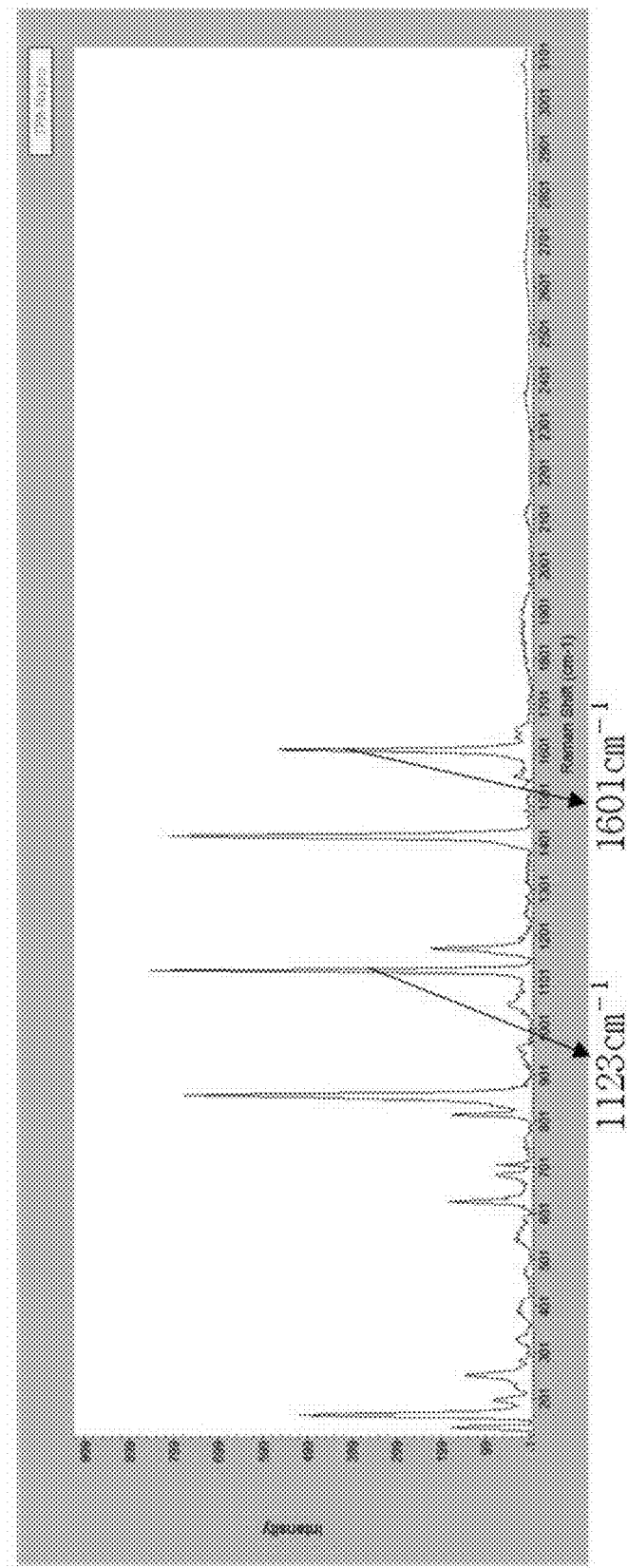
[FIG. 4]

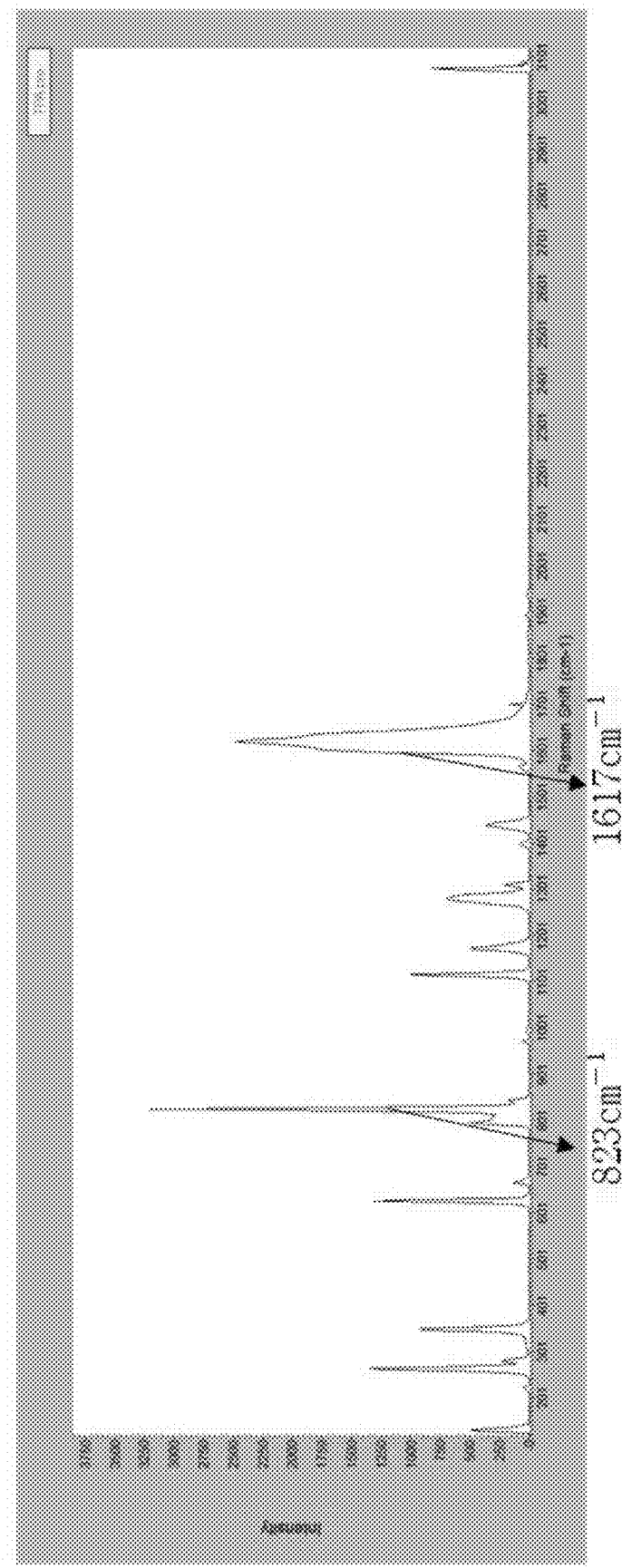
[FIG. 5]

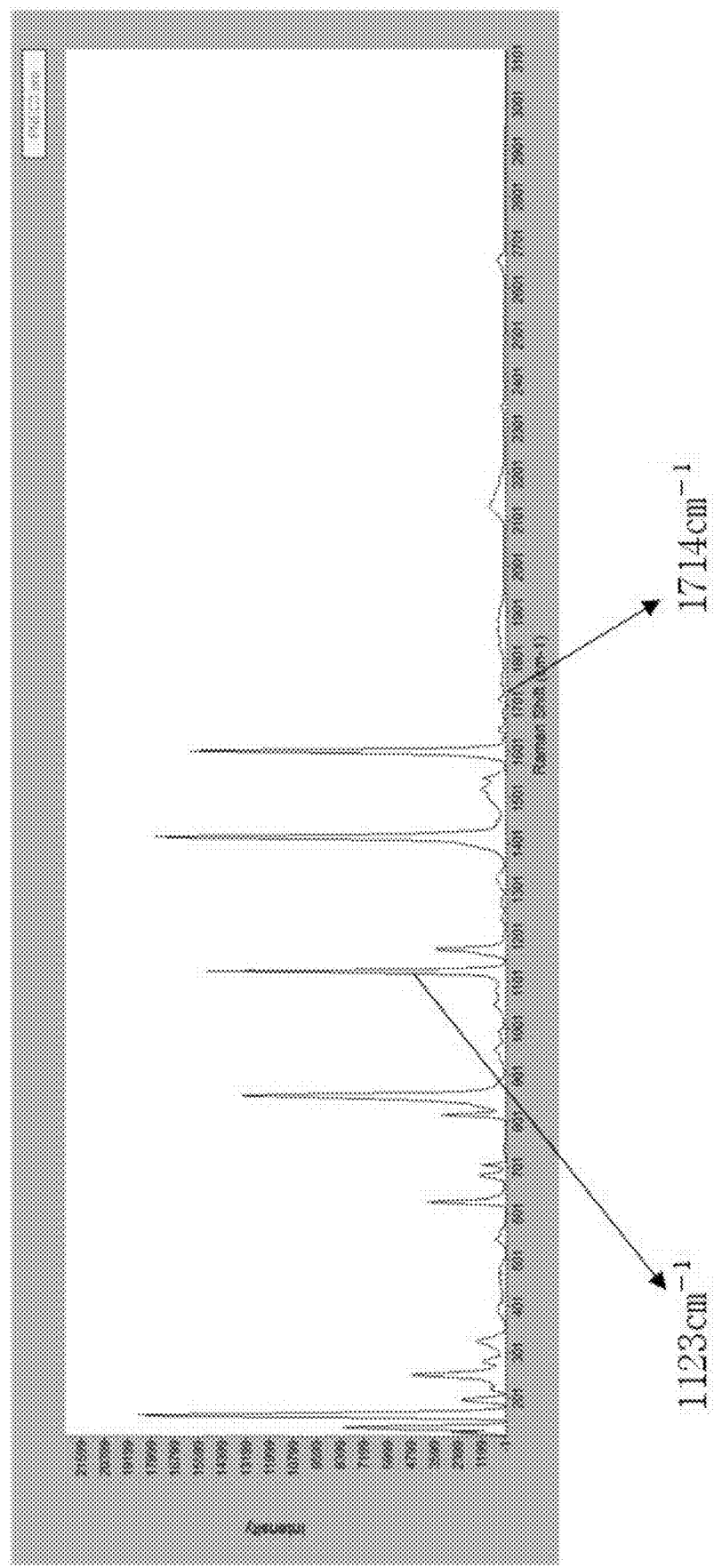
[FIG. 6]

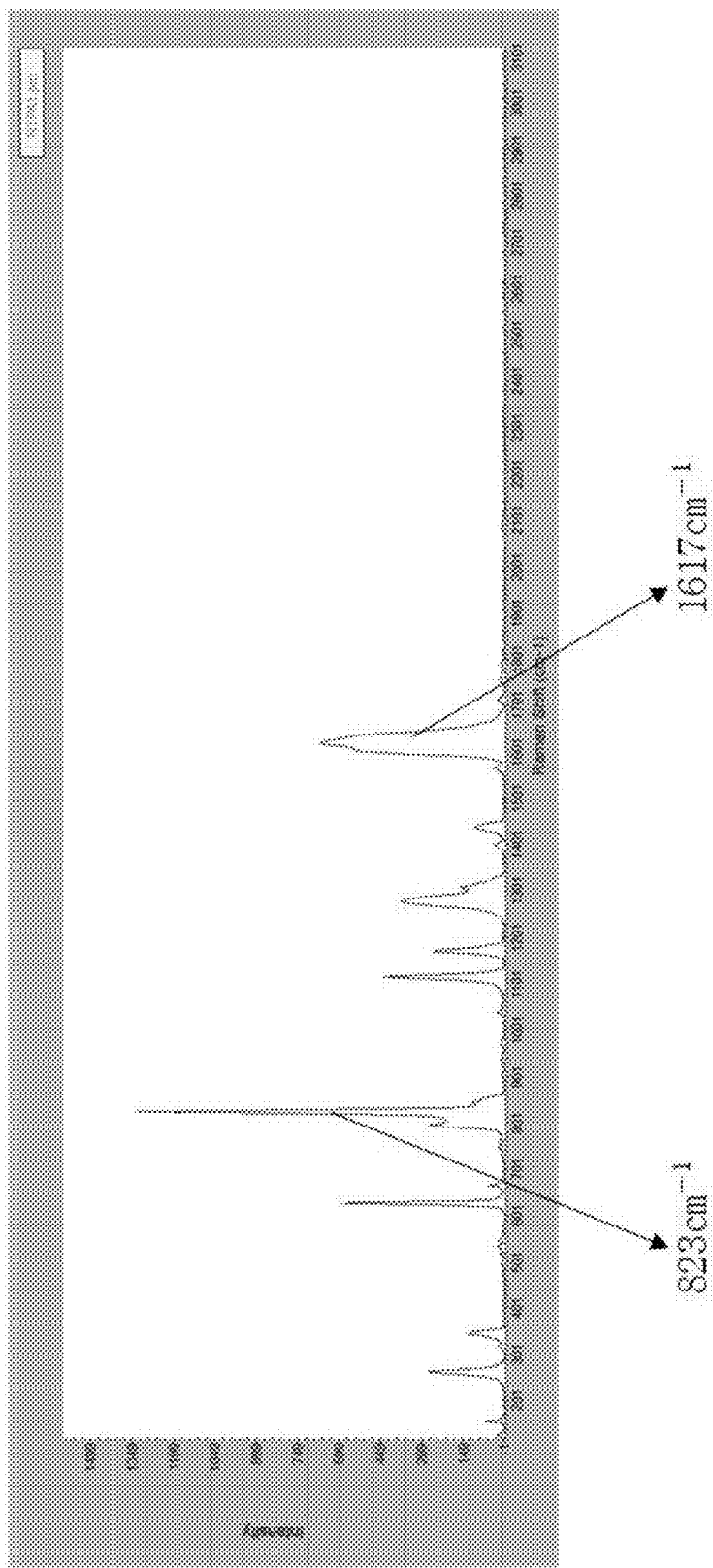
[FIG. 7]

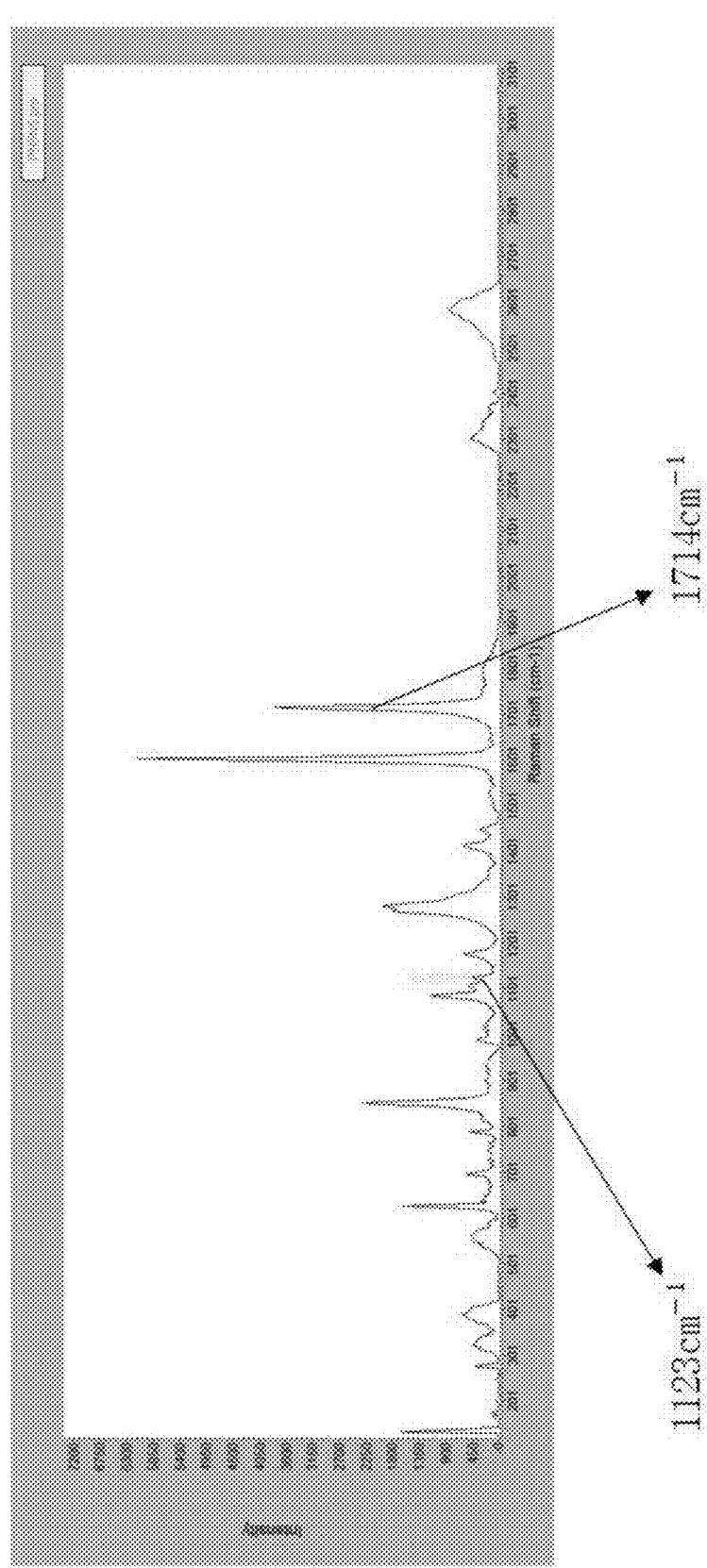
[FIG. 8]

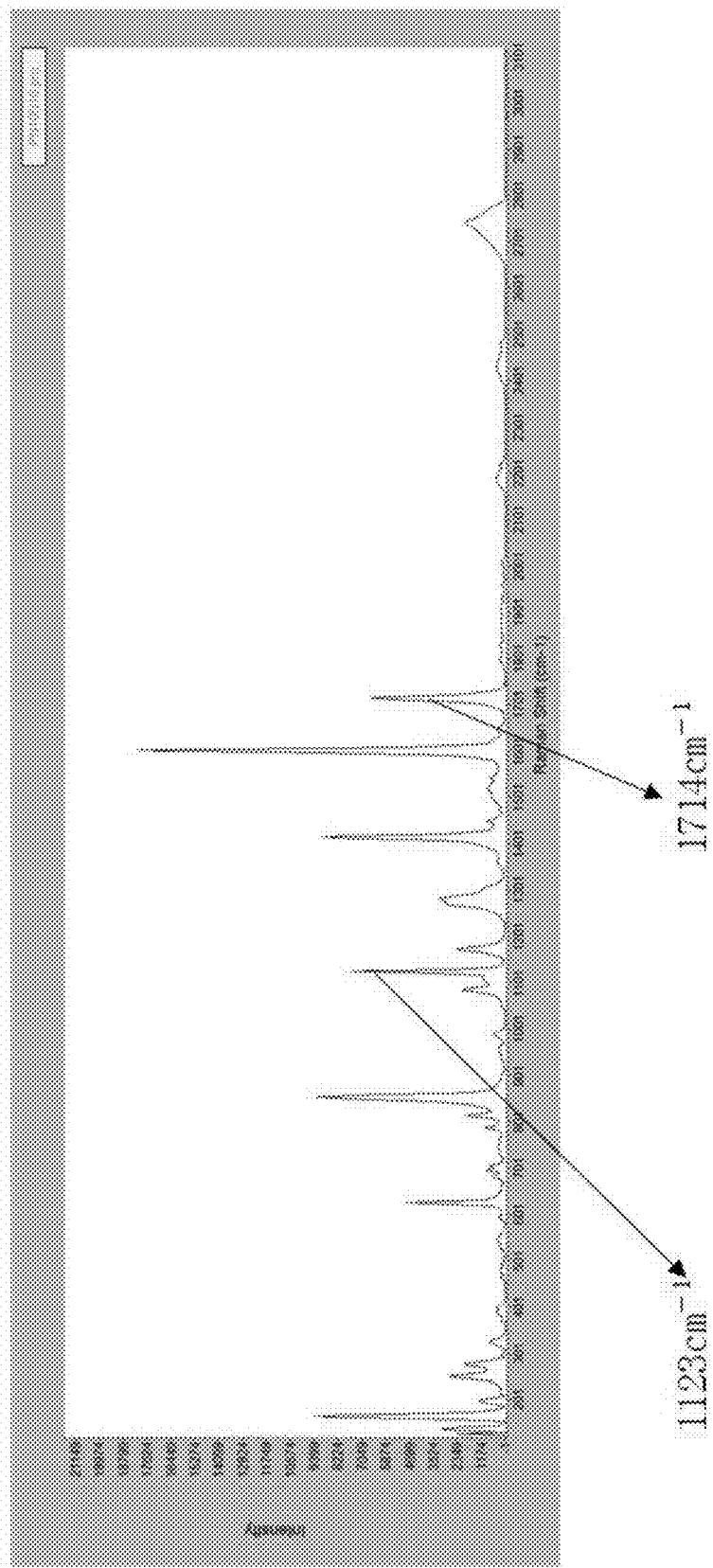
[FIG. 9]

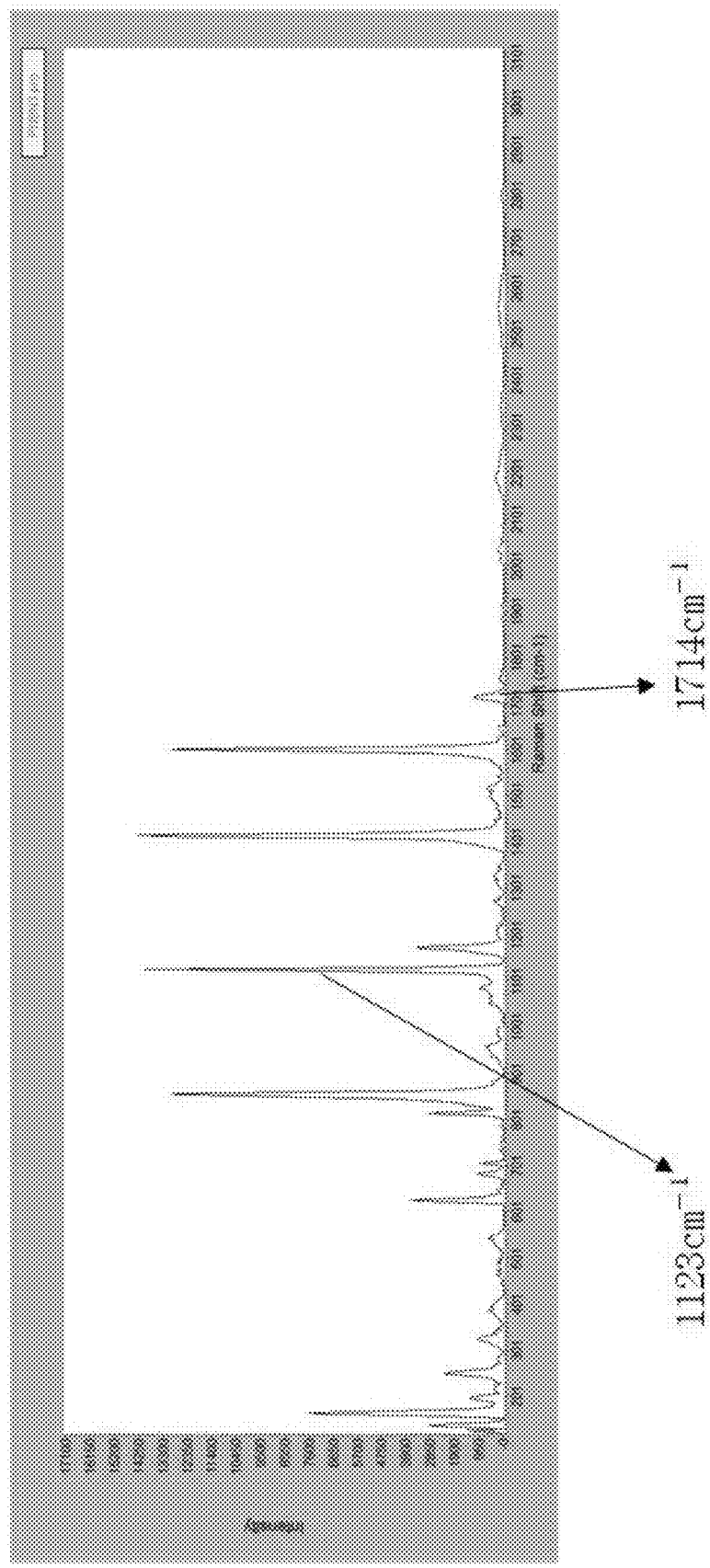
[FIG. 10]

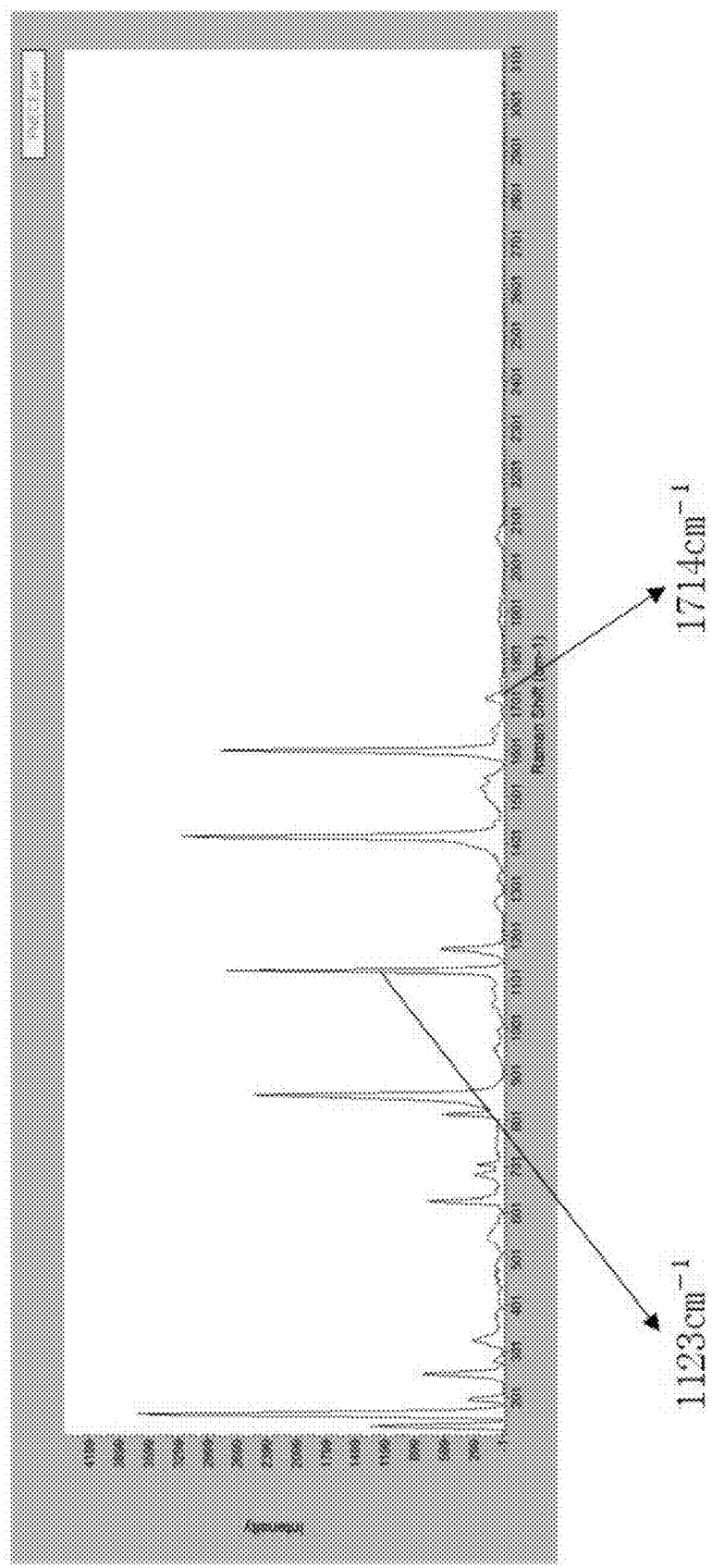
[FIG. 11]

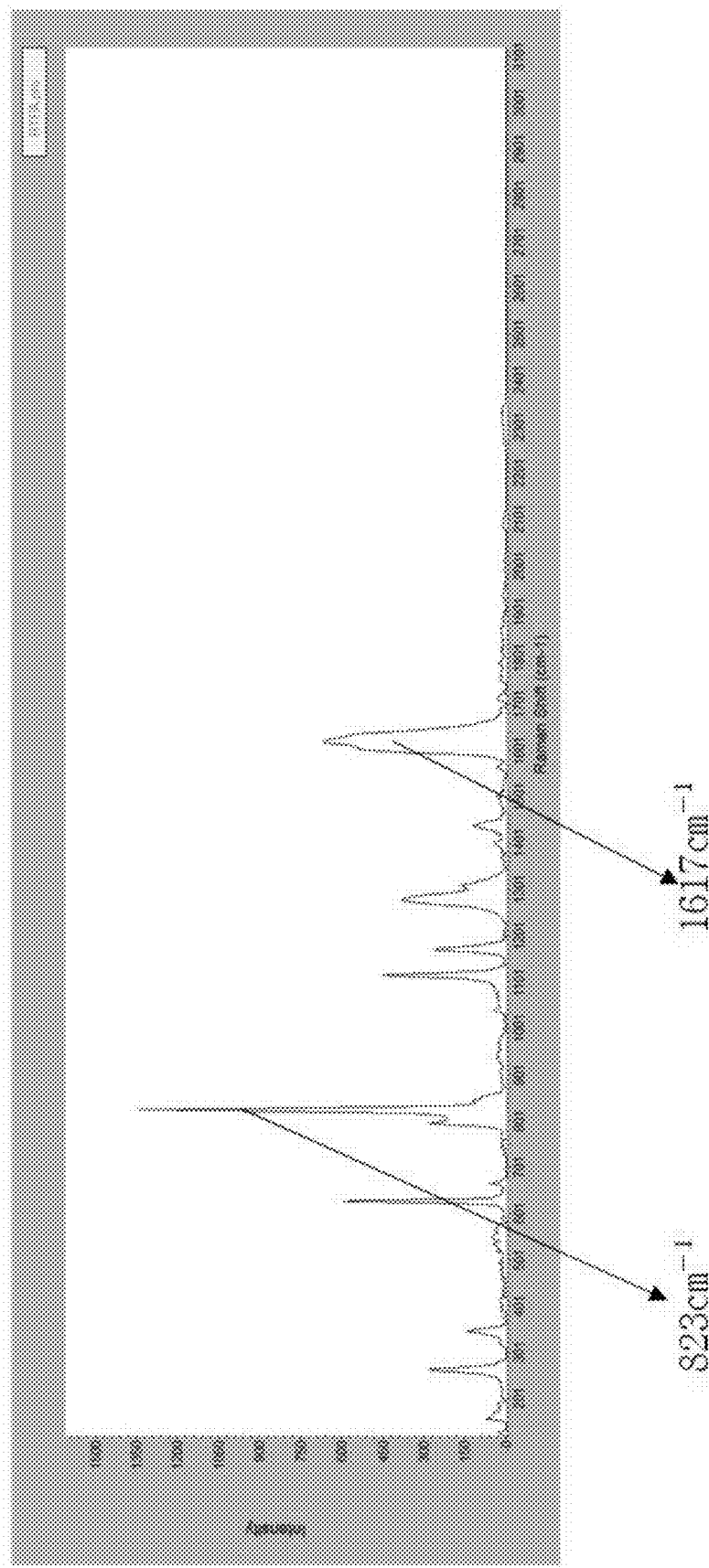
[FIG. 12]

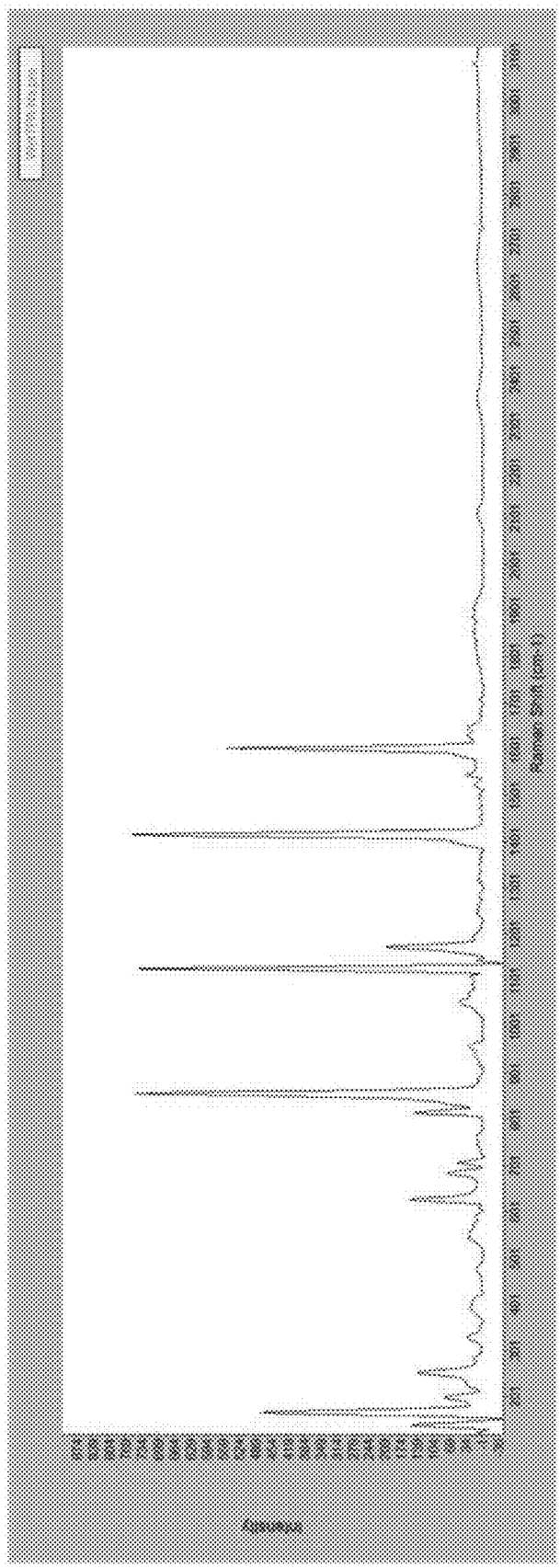
[FIG. 13]

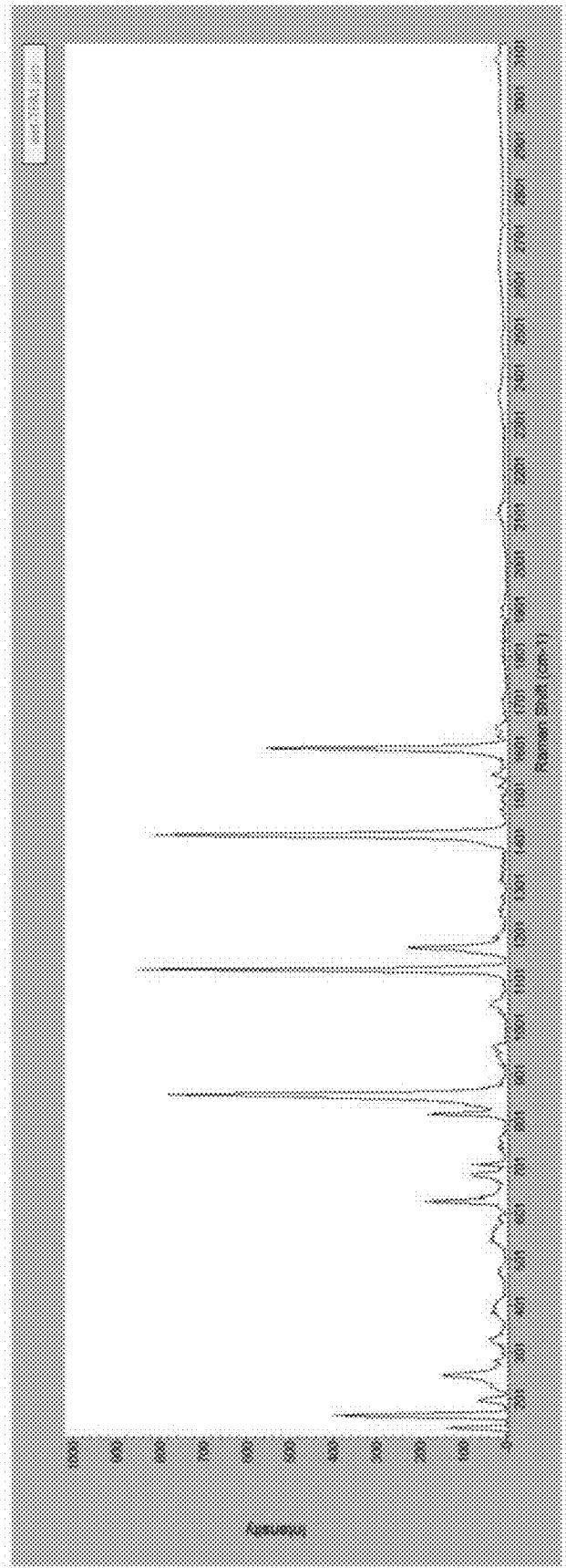
[FIG. 14]

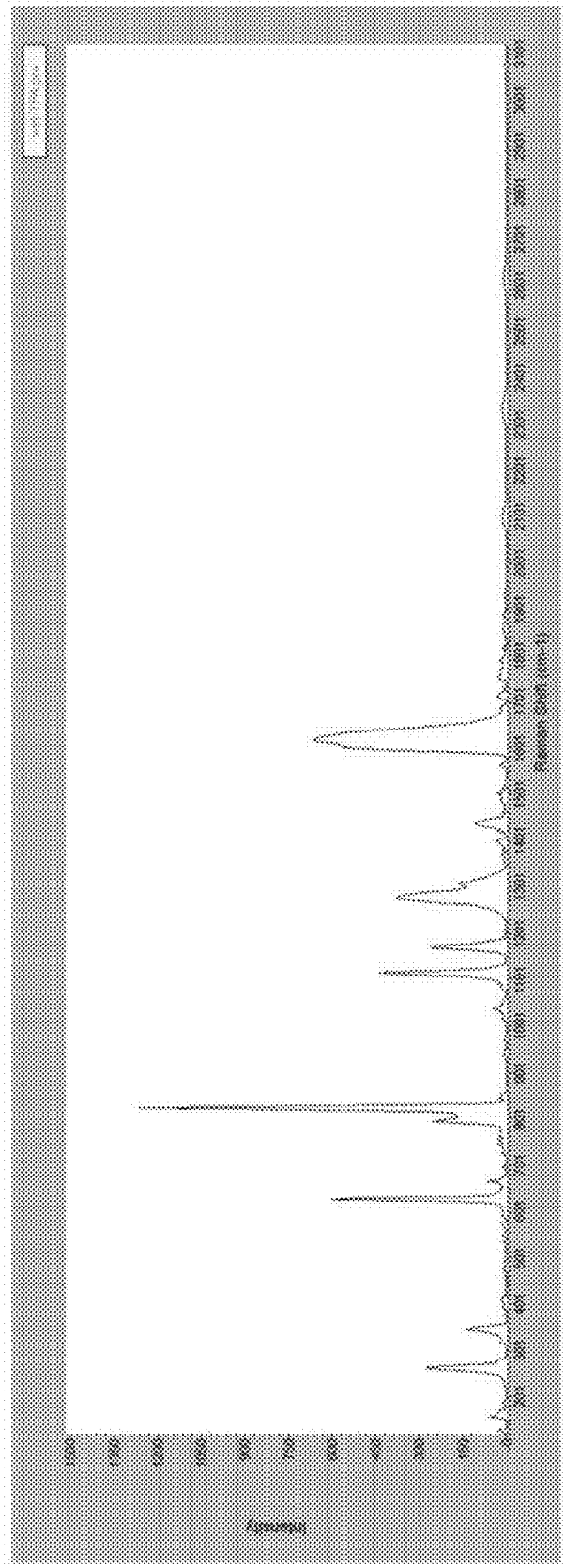
[FIG. 15]

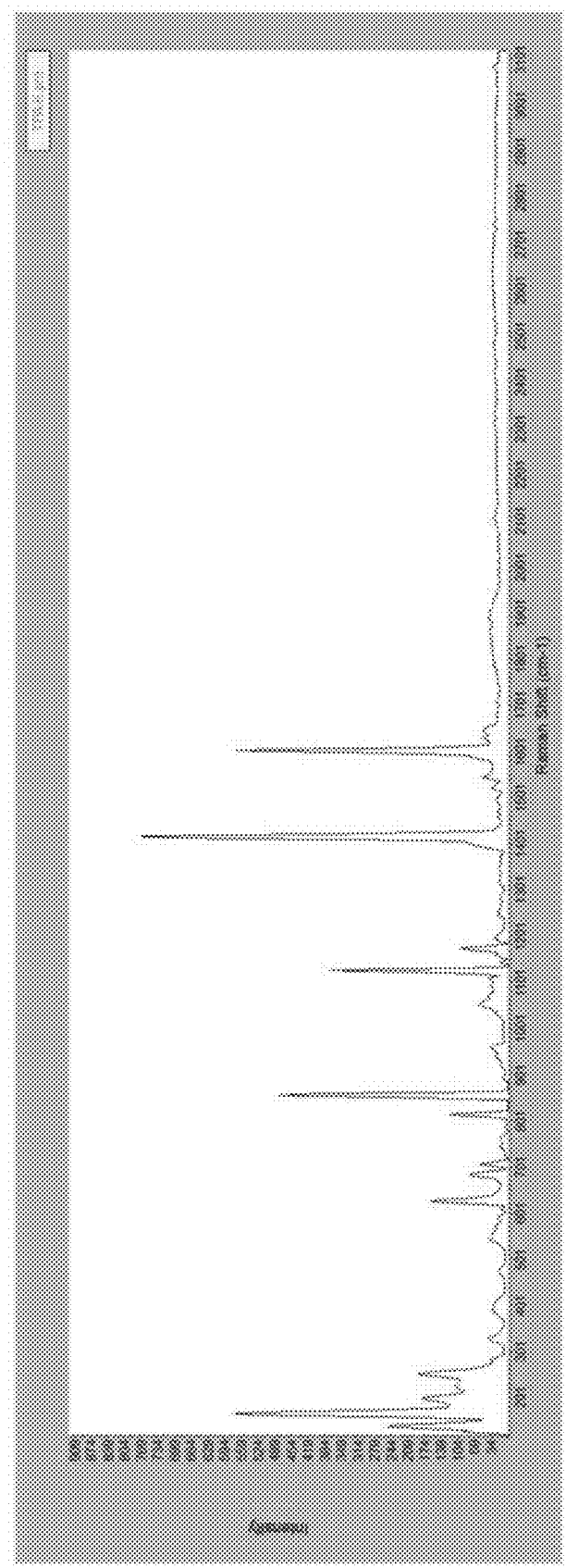
[FIG. 16]

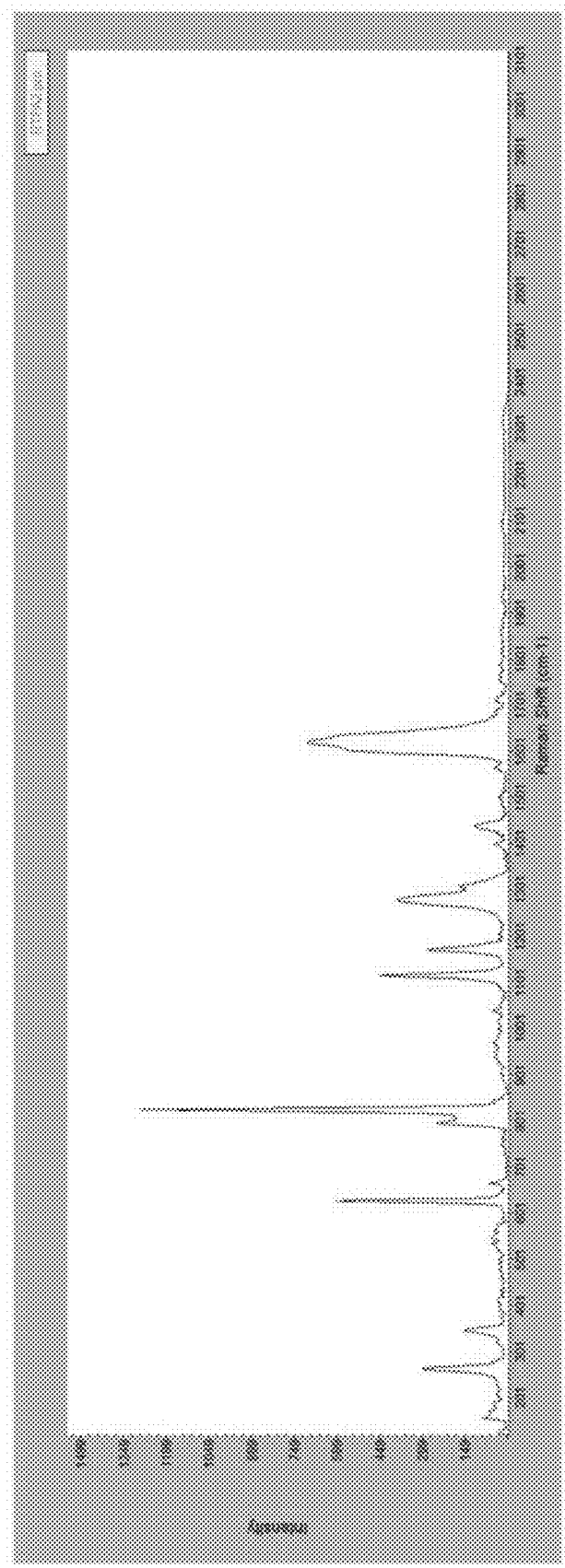
[FIG. 17]

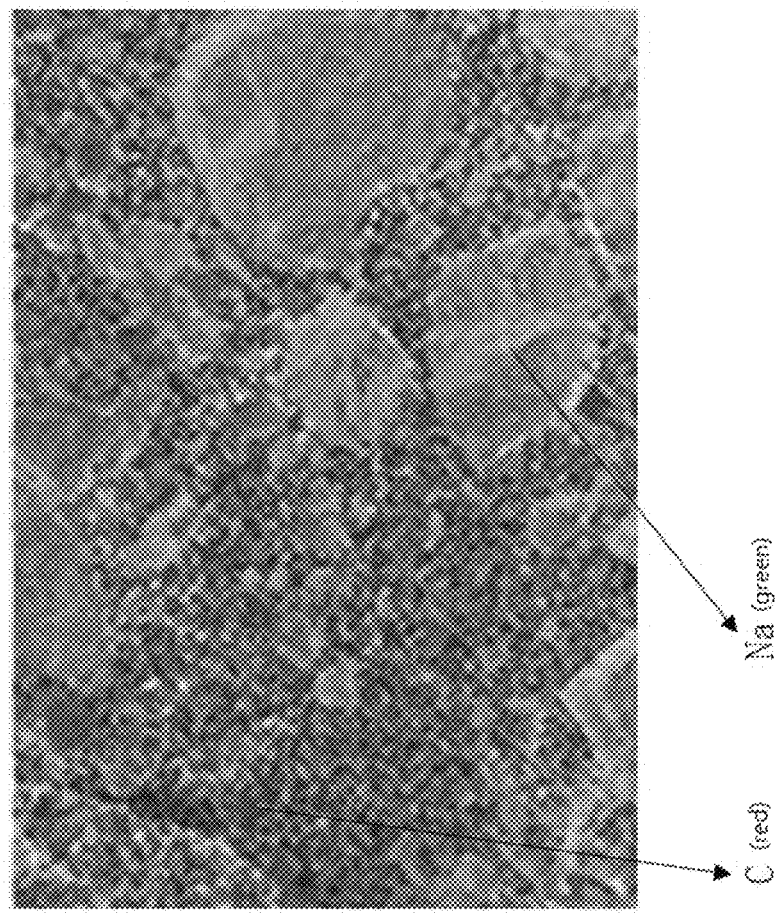
[FIG. 18]

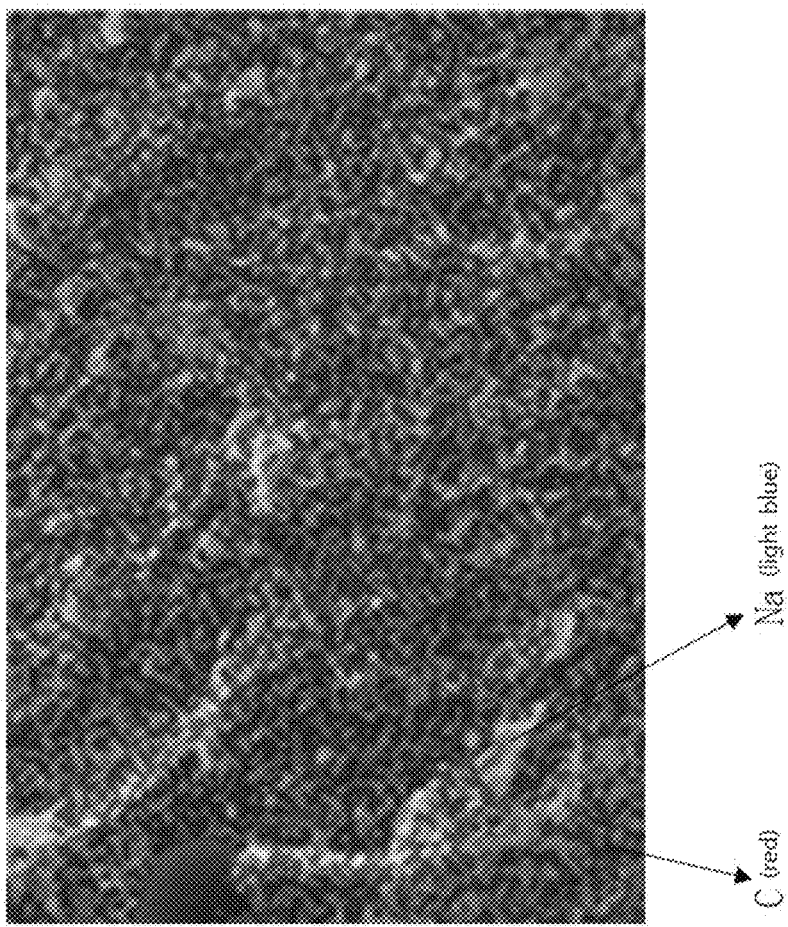
[FIG. 19]

[FIG. 20]
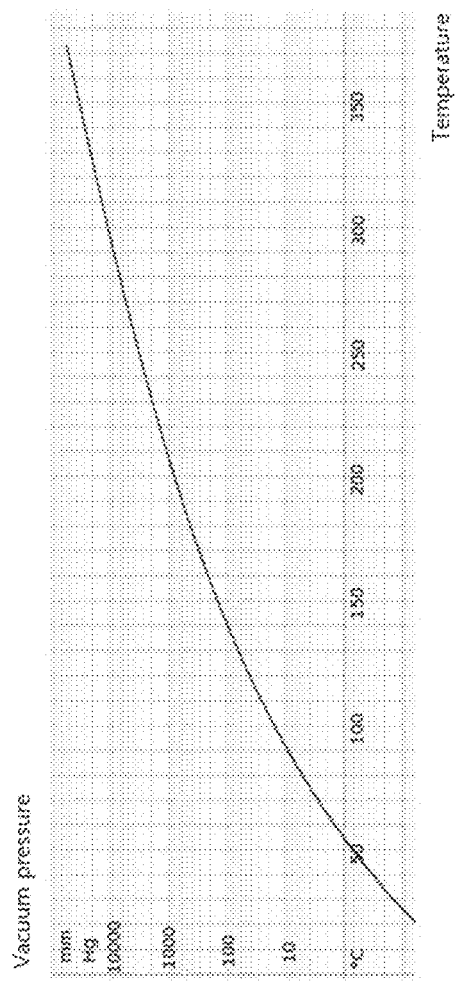

METHOD OF MANUFACTURING FOR TEREPHTHALIC ACID USING POLYETHYLENE TEREPHTHALATE WITH HIGH DEGREE OF POLYMERIZATION MORE THAN 0.75 DL/G OF INTRINSIC VISCOSITY

CROSS REFERENCE TO RELATED APPLICATIONS

This application claims the priority benefit of Korean Patent Application No. 10-2021-0127706 filed on Sep. 28, 2021, the entirety of which is incorporated by reference herein.

BACKGROUND OF THE INVENTION

1. Field of the Invention

The present invention relates to a method for production of terephthalic acid using polyethylene terephthalate with a high polymerization degree, which has an intrinsic viscosity of 0.75 dl/g or more, and more specifically, to a method for producing terephthalic acid with high yield and favorable process stability by hydrolysis of polyethylene terephthalate with a high degree of polymerization, which has an intrinsic viscosity of 0.75 dl/g or more, without using any organic solvent.

2. Description of the Related Art

For chemical recycling of polyethylene terephthalate (hereinafter abbreviated as "PET"), a molecular chain decomposition process such as depolymerization performed to break molecular chains at high temperature and high pressure in an ethylene glycol (hereinafter referred to as "EG") solvent or hydrolysis performed in a polar solvent such as alcohols in the presence of acid or alkali is required.

At this time, if PET does not have a high polymerization degree with IV=0.6 dl/g or less, the following three methods represented by [Scheme 1] below are typically used.

A first method is to produce dimethyl terephthalate (DMT) by decomposition of PET in the presence of a methyl alcohol solvent through methanolysis as in (a) of [Scheme 1], wherein a predetermined amount of an organic solvent such as dimethyl sulfoxide (DMSO), dichloromethane, etc. is mixed therein to accelerate swelling of PET, thereby enabling a reaction to occur even under weaker conditions.

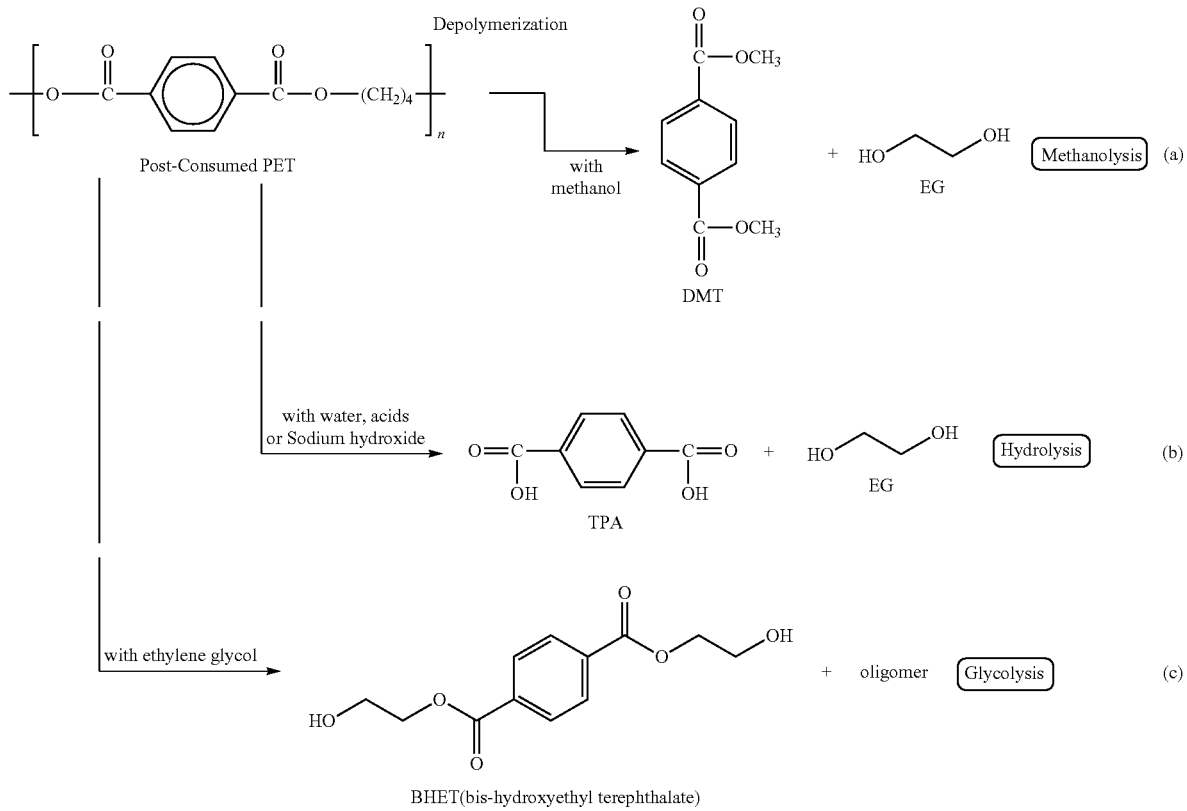

- DMT: dimethyl terephthalate
- TPA: terephtalic acid
- EG: ethylene glycol

A second method includes hydrolysis of PET using an alkaline material such as NaOH in a polar organic solvent to relatively easily decompose PET into disodium terephthalate (TPA-$Na_2$) and ethylene glycol (EG) as in (b) of [Scheme 1], wherein disodium terephthalate is easily converted into terephthalic acid (TPA) by acid. This process has already been widely used in the recycling of polyethylene terephthalate fiber waste, weight-reducing process of PET fabrics or the like.

In some cases, it was emphasized that adding an organic solvent (e.g., DMSO) for molecular chain swelling may allow a significant level of hydrolysis even with heat generated when alkali is dissolved in alcohol (Loop Industries U.S. Pat. No. 9,550,713B1). However, even at this time, in the case of fibers or packaging materials made of PET at a low polymerization degree, PET would be hydrolyzed to some extent even though not completely. On the other hand, in the case of PET with high polymerization degree which has an intrinsic viscosity of 0.75 dl/g or more, it is presumed that an insignificant level of hydrolysis may be performed due to weak DMSO swelling effects.

A third method is illustrated in (c) of [Scheme 1], which uses EG as a solvent for glycolysis of PET at high temperature and high pressure to decompose PET into bis(2-hydroxyethyl) terephthalate (BHET) and oligomers. This is the most widely used method for recycling waste PET in PET manufacturers for a long time. These reaction products can be mixed again in a polymerization process and used for PET polymerization. This is mainly used as a recycling method of waste PET with little contamination occurring during PET production. In the case of PET polymerization, if raw materials are not maintained with high purity, the polymerization degree is not increased. Therefore, high-purity raw materials only should be used. This is because, when using regenerated PET such as waste PET bottles, it is difficult to completely remove contaminants of the PET and it is also difficult to purify the obtained oligomers to high purity.

As described above, these methods are all methods for implementing a reaction in an organic solvent, and are applicable to PET with a low polymerization degree and in a relatively loose molecular chain state. However, if the polymerization degree is high enough to exceed IV=0.8 dl/g by solid polymerization and heat setting treatment like a PET bottle and a molecular chain is packed very densely, these reactions are not easily performed. In fact, if a pulverized PET bottle mixture (a mixed and pulverized product of water bottle, juice bottle, etc.) is processed to have a solid content of about 30% by weight ("wt. %") and alkali hydrolysis is performed in a high-pressure reaction tube in the presence of an alcohol solvent, more than 20% of un-hydrolyzed PET residues may remain even when implementing alkali hydrolysis for 1 week at a reaction pressure of 3 to 5 bar and a boiling point of alcohol while refluxing and strongly stirring. In particular, in the case of heat-resistant PET bottles for juice beverage, these are produced according to 2-stage blowing process including a heat setting stage much stronger than that in the case of general mineral water bottles, as compared to the general mineral water bottles produced by 1-stage blowing process. Therefore, the produced heat-resistant PET bottle may have a high molecular weight and much higher crystallinity and exhibit ultra-dense molecular chain packing, thereby entailing alkali hydrolysis much more difficult than general mineral water PET bottles. These are not likely soluble in a strong solvent such as hexafluoroisopropanol (HFIP) (1)-trifluoroacetic acid (TEA) which is a solvent used for PET IV measurement, while remaining a significant amount of undissolved matters. As a result, more undecomposed residues are generated during normal hydrolysis. The surfaces of these residues swell in the solvent, agglomerate together like a rice cake, and stick to a reactor wall and a stirrer. Consequently, the reactor becomes inoperable, and an outlet of the reactor is blocked and may make it impossible to normally discharge a reaction product. Alcohols such as methanol, ethanol, etc. used as general hydrolysis solvents showed similar hydrolysis results in spite of difference in solvent properties, and even when an organic solvent (DMSO, $CH_2Cl_2$, etc.) for swelling is added in a level of unit %, the above results were not improved significantly.

Like fibers, moderate or low polymerization degree PET with an IV of about 0.55 dl/g is completely decomposed into monomers within 1 hour when heated and refluxed by acid or alkali in a polar organic solvent. Even in this case, a toxic and explosive organic solvent should be used as a reaction solvent for rapid hydrolysis, in particular, a large amount of strong acid or strong alkali should be used.

In the case of high polymerization degree PET having an intrinsic viscosity of 0.75 dl/g or more, as mentioned above, decomposition partially starts on the surface during hydrolysis by a known method. However, due to high degree of polymerization, the decomposition does not further proceed to the inside, whereas surface swelling only occurs. When the surface is changed into a gel-like state and has viscous property, PET pieces agglomerate together even if strongly stirred. The PET bottle pieces stick to an inner wall of the reactor and the stirrer over time, and even the reaction products would also be agglomerated thereon to form a solid rice cake-like mass. As a result, it is impossible for acid and alkali to penetrate the inside anymore, such that a decomposition rate drops and a smooth reaction is no longer performed. The best way to reduce this phenomenon is to pulverize a sample PET as finely as possible, but mechanical or physical pulverization of PET is not easy at room temperature. Specifically, in the case of PET bottle, it is difficult to pulverize PET in a powder state, instead, it is common to tear PET into pieces as much as possible before use. In general, plastics are pulverized using a liquid N2 freezer ball mill or a ball mill. Crystalline polymers or high hardness polymers are pulverized relatively well, but PET is hardly pulverized due to non-crystalline nature thereof. Furthermore, a high polymerization degree PET having an intrinsic viscosity of 0.75 dl/g or more is much more hardly pulverized, and thus such a milling method as described above is insignificant in terms of economic feasibility.

For these reasons, until now, PET bottle with a high degree of polymerization has very little undergone chemical recycling with economical advantage, instead, is mostly subjected to a recycling process that converts the PET bottle into low-quality fibers such as filling cotton or staple fibers through simple melt-spinning after washing and drying.

The chemical decomposition of PET as described above entails the following significant problems.

First, although there is a difference in extents, conventional methods have problems in that a toxic and highly flammable organic solvent with a low boiling point is used as a reaction solvent, and heating and pressurization are required for performing a rapid reaction. The most commonly used solvents for alkali hydrolysis include alcohols such as ethanol, methanol, etc. Although there is a difference in extents, these solvents are toxic to the skin and eyes, have a low boiling point and are highly volatile, whereby these are likely fired, and vacuum thereof is strongly toxic and also involves high risk of explosion.

Second, in the case of EG depolymerization, substances such as cyclic oligomers and butylated hydroxytoluene (BHT) that are harmful to the human body are generated, and thus may pose a threat to health when repolymerized into PET for mineral water and food containers.

In the case of hydrolysis including addition of an organic solvent for swelling such as dimethyl sulfoxide (DMSO) and dichloromethane ($CH_2Cl_2$), these materials should be separated again after the reaction, and it becomes difficult to obtain high-purity monomer products due to by-products. In fact, in order to obtain a high-purity product, a quite high level of purification equipment is additionally required. Also, in many cases, the final product of decomposition is di-methylterephthalate (DMT) rather than terephthalic acid (TPA). In this case, further various monomers and/or oligomers including terephthalic acid (TPA) are generated as impurities. At this time, purification itself is very little possible, and it is more difficult to use the above product as a raw material for PET polymerization requiring ultra-high purity.

Third, a more decisive problem is that a high polymerization degree PET having an intrinsic viscosity of 0.75 dl/g or more is not easily decomposed as in (a), (b) and (c) of [Scheme 1]. A PET bottle containing mineral water is the most representative product of the high polymerization degree PET having an intrinsic viscosity of 0.75 dl/g or more, while a heat-resistant PET bottle for juice has also high crystallinity, which makes it difficult to decompose the PET bottle. In the case of a high strength fiber such as PET tire cords that require stronger mechanical properties, IV may be increased even to IV=1.0 to 1.2 dl/g.

A PET bottle has high polymerization degree, and in a manufacturing process, is subjected to high elongation and heat-setting in order to form a cross-packing state in which molecular chains are densely stacked. For this reason, a reaction solvent or alkali hardly permeate between molecules during decomposition, hence causing difficulties in reaction proceeding from the surface to the inside.

SUMMARY OF THE INVENTION

An object of the present invention is to provide a method for production of terephthalic acid in high yield and with favorable process stability by hydrolyzing a high polymerization degree polyethylene terephthalate having an intrinsic viscosity of 0.75 dl/g or more without the use of an organic solvent.

Specifically, it is intended to solve problems related to safety and low reactivity of the organic solvents as described above in the economic hydrolysis reaction of PET, and in particular, an object of the present invention is to solve a problem of low reactivity of a high polymerization degree PET having an intrinsic viscosity of 0.75 dl/g or more such as a PET bottle that has a difficulty in reaction.

In order to achieve the above objects, the present invention provides a method for production of terephthalic acid, including: (i) introducing high polymerization degree polyethylene terephthalate having an intrinsic viscosity of 0.75 dl/g or more into a continuous reactor, and then heating and pressurizing the same to prepare a fluidal polyethylene terephthalate, (ii) introducing a mixed slurry prepared by mixing an alkaline material (abbrev. to "alkali") containing an alkali-metal, a weak acid salt of the alkali-metal and ethylene glycol together into an internal position of the continuous reactor, through which the fluidal polyethylene terephthalate passes, and implementing neat reaction of the fluidal polyethylene terephthalate with the mixed slurry in the continuous reactor to prepare alkali-metal terephthalate; and (iii) dissolving the prepared alkali-metal terephthalate in water, removing foreign substances through filtration and centrifugation, adding acid to the alkali-metal terephthalate dissolved in water and reacting the same, thereby producing terephthalic acid.

Specifically, unlike the conventional decomposition reaction in which an organic solvent such as ethanol or methanol is put as a reaction solvent in a batch reactor, followed by the reaction, a continuous decomposition reaction through neat reaction using an extruder type continuous reactor is adopted wherein PET itself molten without a separate reaction solvent serves as both a reactant and even a solvent. Specifically, PET may be molten by adjusting the reaction temperature and pressure in the continuous reactor, and a mixture of ethylene glycol (EG) in a catalyst level, an alkali-metal based alkaline material and a weak acid salt of the alkali-metal may be introduced thereto. As an embodiment, when using NaOH as an alkali, $Na_2CO_3$ as a salt of NaOH and a weak acid, that is, $H_2CO_3$ is added. As shown in the following [Scheme 2], when PET is hydrolyzed, disodium terephthalate (TPA-$Na_2$) and ethylene glycol (EG) are generated, and a Na+ concentration is gradually decreased which in turn causes a gradual reduction in a hydrolysis reaction rate. However, at this time, if $Na_2CO_3$ as a weak acid salt of Na+ is present, it is also dissolved in ethylene glycol (EG) as a polar solvent to generate a larger amount of Na+, which in turn serves to further increase the concentration of Na+ along with a concentration of Na+ generated from NaOH, thereby forming a larger amount of NaO—$C_2H_2$—ONa. The concentration of Na+ is maintained not to be lowered through hydrolysis of PET, thereby maintaining the reaction rate higher.

[Scheme 2]

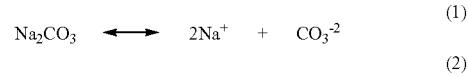

(1)

(2)

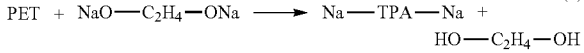

(3)

Then, when the hydrolysis of PET starts, initially generated EG may act as a solvent and an accelerated catalyst simultaneously, whereby the hydrolysis reaction proceeds more rapidly.

In order to maintain a high reaction rate and improve reaction efficiency, it is very important to properly control reaction temperature and pressure. The reaction temperature is preferably maintained as low as possible over the entire reaction period. This is required in order that generation of impurities due to side reaction may be reduced while decreasing the reaction pressure, and thereby making it easier to control the reaction. When PET is initially molten and then alkali and a weak acid salt thereof are mixed with the molten PET as in [Scheme 2] above, the hydrolysis reaction proceeds rapidly and the molecular weight is rapidly decreased. As a result of the reaction, TPA-$Na_2$ salt and ethylene glycol (EG) are produced. At this time, the produced TPA-$Na_2$ salt is solid powder and another product, that is, ethylene glycol (EG) is liquid. TPA-Na$_2$ has a boiling point of 392.4° C. at 1 atm, and thus is very stable to temperature, whereas ethylene glycol (EG) has a boiling point of 197° C. at 1 atm, therefore, preferably requiring the reaction temperature to be maintained as low as possible. This is because EG generated during the hydrolysis reaction should be maintained in a liquid state without being vaporized so that the EG can be uniformly admixed with molten PET and act as a solvent. Further, some EG becomes Na—$OC_2H_4O$—Na to more accelerate the hydrolysis reaction.

FIG. 20 is a graph showing a correlation between a temperature and a vapor pressure of EG. In order for EG to maintain a liquid state at a specific temperature, a pressure higher than the corresponding vapor pressure should be applied. For example, the boiling point of EG at 1 atm is 197° C. and the vapor pressure is 760 mmHg at this time. At 260° C., that is, a melting point of PET, EG may have a vapor pressure of about 4000 mmHg (about 5.3 atm). In order to maintain EG in a liquid state at this temperature, the reaction pressure should be maintained higher than 5.3 atm.

In the actual process, when PET is decomposed and EG starts to form, a molecular weight of PET is rapidly decreased, and even if the reaction temperature is maintained at a temperature lower than 260° C. by 20 to 30° C., PET may remain in a molten state. At this time, the vapor pressure of EG is less than 2000 mmHg, and even by maintaining the reaction pressure of about 2.5 to 3 atm without applying a high pressure of more than 5.3 atm, EG can be maintained in a liquid state thus to retain a high hydrolysis reaction rate. In this way, in order to maintain the reaction temperature low and to improve mixing effects, the alkali may be introduced dividedly in two stages. First, if a small amount of alkali (e.g., NaOH) is added during initial feeding of PET to a continuous reactor (extruder), the average molecular weight of PET is decreased due to primary hydrolysis, thereby lowering the melting temperature. At the same time, it is mixed with a small amount of generated EG to further reduce a viscosity, which in turn mitigates reaction conditions and makes the decomposition reaction easier to control. Then, for a full-scale decomposition reaction, a mixed slurry of alkali containing an alkali-metal, a weak acid salt of the alkali-metal and ethylene glycol may be introduced in an amount sufficient for reaction to reaction zone 2 which is a mixing zone of the continuous reactor at a much lower reaction temperature. Even when the introduced amount is large, a viscosity of PET may be reduced by primary hydrolysis to allow mixing much easier.

As such a continuous reactor, an extruder is typically used as the most common reactor because screws provided in the extruder may be combined with different spiral type screws. That is, it is possible to set device characteristics according to the reaction conditions such as different temperatures and pressures for each reaction zone, and high productivity can be achieved even with a small-sized device because it is a continuous type device. Of course, in the case of using a high efficiency twin-screw extruder, it is possible to react much faster and with higher yield due to higher mixing efficiency, as compared to using a single screw extruder.

According to the present invention, terephthalic acid can be produced in high yield and with favorable process safety from high polymerization degree polyethylene terephthalate having an intrinsic viscosity of 0.75 dl/g or more, which is difficult to hydrolyze even with an organic solvent due to its high degree of polymerization, even without the use of an organic solvent.

The present invention can rapidly hydrolyze high polymerization degree PET having an intrinsic viscosity of 0.75 dL/g or more, which was previously difficult to hydrolyze smoothly, through a neat reaction without the use of a toxic organic solvent. Further, since the reaction temperature is also achieved within a short time below the melting point of PET, it is possible to obtain only pure hydrolysates with almost no side reactants due to thermal decomposition. Above all, low-boiling organic solvents, which are toxic and have a high fire hazard, are not used thus to greatly improve process safety.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects, features and other advantages of the present invention will be more clearly understood from the following detailed description taken in conjunction with the accompanying drawings, in which:

FIG. 1 is a schematic diagram illustrating a process for producing alkali-metal terephthalate by introducing high polymerization degree PET having an intrinsic viscosity of 0.75 dl/g or more, NaOH, EG and $Na_2CO_3$ into an extruder and performing a neat reaction;

FIG. 2 is a cross-sectional view exemplarily showing the shape of a screw constituting the extruder of FIG. 1;

FIG. 3 illustrates a Raman spectroscopy spectrum of the high polymerization degree PET having an intrinsic viscosity of 0.75 dl/g or more used in examples of the present invention;

FIG. 4 illustrates a Raman spectroscopy spectrum of sodium terephthalate as a standard substance;

FIG. 5 illustrates a Raman spectroscopy spectrum of terephthalic acid as a standard substance;

FIG. 6 illustrates a Raman spectroscopy spectrum of the sodium terephthalate prepared in Example 1.

FIG. 7 illustrates a Raman spectroscopy spectrum of the terephthalic acid prepared in Example 2;

FIG. 8 illustrates a Raman spectroscopy spectrum of the sodium terephthalate prepared in Comparative Example 1;

FIG. 9 illustrates a Raman spectroscopy spectrum of the sodium terephthalate prepared in Comparative Example 2;

FIG. 10 illustrates a Raman spectroscopy spectrum of the sodium terephthalate prepared in Comparative Example 3;

FIG. 11 illustrates a Raman spectroscopy spectrum of the sodium terephthalate prepared in Comparative Example 4;

FIG. 12 illustrates a Raman spectroscopy spectrum of the terephthalic acid prepared in Comparative Example 5;

FIG. 13 illustrates a Raman spectroscopy spectrum of the sodium terephthalate prepared in Comparative Example 6;

FIG. 14 illustrates a Raman spectroscopy spectrum of the sodium terephthalate prepared in Comparative Example 7;

FIG. 15 illustrates a Raman spectroscopy spectrum of the terephthalic acid prepared in Comparative Example 8;

FIG. 16 illustrates a Raman spectroscopy spectrum of the potassium terephthalate prepared in Example 3;

FIG. 17 illustrates a Raman spectroscopy spectrum of the terephthalic acid prepared in Example 4;

FIG. 18 is a 500-fold Na SEM-EDS distribution photograph obtained in Comparative Example 9;

FIG. 19 is a 500-fold Na SEM-EDS distribution photograph obtained in Example 5; and FIG. 20 is a graph showing the correlation between the temperature and vapor pressure of EG.

DETAILED DESCRIPTION OF THE INVENTION

Hereinafter, the present invention will be described in detail with reference to the accompanying drawings.

The production method according to the present invention may include: (i) introducing polyethylene terephthalate (PET) having a polymerization degree of 0.75 dl/g or more into an extruder type continuous reactor, and then heating and pressurizing the same to prepare a fluidal polyethylene terephthalate; (ii) introducing a mixed slurry prepared by mixing alkali containing an alkali-metal, a weak acid salt of the alkali-metal and ethylene glycol together into an internal position of the continuous reactor, through which the fluidal polyethylene terephthalate passes, and implementing neat reaction of the fluidal polyethylene terephthalate with the mixed slurry in the continuous reactor to prepare alkali-metal terephthalate; and (iii) dissolving the prepared alkali-metal terephthalate in water, removing foreign substances such as impurities through filtration and centrifugation, adding acid to the alkali-metal terephthalate dissolved in water and reacting the same, thereby producing terephthalic acid.

Specifically, in the present invention, polyethylene terephthalate (PET) having a polymerization degree of 0.75 dl/g or more may be put firstly into an extruder type continuous reactor, followed by heating and pressurizing the same to prepare a fluidal polyethylene terephthalate.

Polyethylene terephthalate having a polymerization degree of 0.75 dl/g or more may be a homo-polymer or a copolymerized polymer (copolymer).

In the present invention, when the polyethylene terephthalate having a polymerization degree of 0.75 dl/g or more is introduced into the extruder type continuous reactor, it is more preferable to introduce alkali containing an alkali-metal along with the same.

A content of alkali containing an alkali-metal, which is introduced into the continuous reactor together with polyethylene terephthalate having a polymerization degree of 0.75 dl/g or more, may be adjusted to be 5 to 10% in a ratio by weight ("wt. %") with respect to the polyethylene terephthalate.

Next, a mixed slurry prepared by mixing alkali containing an alkali-metal, a weak acid salt of the alkali-metal and ethylene glycol may be introduced into an internal position of the continuous reactor, through which the fluidal polyethylene terephthalate passes, followed by performing neat reaction of the fluidal polyethylene terephthalate and the mixed slurry in the continuous reactor, thereby producing alkali-metal terephthalate.

At this time, it is preferable to introduce the mixed slurry dividedly into stages 1 to 5 at different positions of the continuous reactor through which the fluidal polyethylene terephthalate passes.

Alkali-metals to form the alkali containing an alkali-metal and the weak acid salt of the alkali-metal may be lithium (Li), sodium (Na) or potassium (K), etc.

The weak acid salt of the alkali-metal may be a salt produced by a reaction of the alkali-metal and carbonic acid ($H_2CO_3$), a salt produced by a reaction of the alkali-metal and phosphoric acid ($H_3PO_4$), a salt produced by a reaction of the alkali-metal and acetic acid, a salt produced by a reaction of the alkali-metal and formic acid or the like.

Next, after dissolving the alkali-metal terephthalate in water, foreign substances are removed through filtration and centrifugation, followed by adding acid to the alkali-metal terephthalate dissolved in water to react and produce terephthalic acid.

The greatest feature of the present invention is that organic solvents highly flammable and harmful to the human body are not used as a reaction solvent for decomposition, but neat reaction is performed of molten PET and alkali containing an alkali-metal such as KOH, NaOH, etc., in the presence of the corresponding alkali-metal salt at a catalytic level. The advantage of the neat reaction is that, since harmful compounds acting as a solvent only without direct relation to the reaction are not included, the neat reaction is very favorable in terms of safety, reaction efficiency and reaction rate.

In terms of reactivity, since there is no concentration dilution using a reaction solvent, direct reaction occurs between reactants (that is, the reaction concentration is 100%) whereby the reaction rate is higher than using a solvent and the generation of impurities is significantly reduced due to less side reactions. In the case of such a neat reaction, a melting viscosity of PET is significantly higher than that of a general organic solvent reaction and causes difficulties in mixing the reactants in a batch reactor.

A very useful way to solve the above problem is to use a mixing device such as an extruder as a reactor. With regard to the reaction using the extruder, it is also very important that the reaction rate can be increased by lowering the reaction temperature and the melting viscosity.

Herein, a process of the neat reaction will be described.

First, as shown in FIG. 1, PET is pushed into the extruder having several reaction zones to fluidize the same. At this time, a screw of the extruder does not have the same type of screw structure as a whole, but has a shape suitable for characteristics required for each reaction zone as shown in FIG. 2.

The most important points to consider when setting the temperature of each reaction zone are thermal properties of PET, such as a glass transition point (Tg: about 70° C.), a melting point (Tm: usually about 250 to 260° C.), and a breaking point of EG (bp: 197° C. under 1 atm), etc. When pressure is applied, the above temperatures will of course be different from those at normal pressure.

For each reaction zone, it will be described in more detail as follows.

The first reaction zone 1 is a zone for PET supply and fluidization, and the introduced PET solid pieces are pushed forward while becoming fluidal objects by heat and pressure of the screw and blocks. At this time, if only PET is introduced, the temperature should be raised to a melting point of the PET, but even in this case, a melt viscosity is too high. For smooth supply and fluidization, if alkali is mixed in a ratio by weight of 5 to 10% to the input PET and hydrolysis reaction is performed first while supplying PET, simultaneously, the melting point and viscosity may be reduced, thus making supply easier.

Further, a shape of the screw in the extruder is also important. Generally, the larger a particle size of the input material, the larger pitch of the screw is used. In order to facilitate the supply of PET bottle pieces, the screw pitch may be larger than when using normal PET chips. At this time, an initial temperature of the reaction zone 1, which is a PET supply zone, may be maintained between the glass transition point (Tg) and the melting point (Tm) of PET, and the temperature is usually set to about 100 to 180° C. so that PET is molten during primary decomposition. This is because the molten PET may be mixed well with the secondly introduced alkali in reaction zone 2, which is a second mixing zone.

Specifically, the second mixing zone is reaction zone 2. Herein, the screw is designed to increase mixing efficiency while mixing the fluidal PET and alkali pushed from reaction zone 1. First, a mixing slurry is prepared by mixing a small amount of EG with a slightly excess amount of alkali (e.g., NaOH, KOH) and weak acid salts of alkali-metal (e.g., $Na_2CO_3$, $K_2CO_3$). As a result, EG and alkaline MOH (M: alkali-metal) react to form metal glycolate as shown in [Scheme 3] below. Further, some of the metal salt $M_2CO_3$ are dissociated to generate $M^+$ and $CO_3^{-2}$ ions, all of which are in a mixed state. At this time, an amount of $M^+$ ions should be in excess of the equivalence ratio by about 10 to 20%.

[Scheme 3]

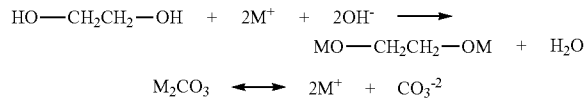

Using a gear pump or a second feeding extruder, the mixed slurry may be quantitatively pushed into a mixing zone of the main extruder and mixed well with the fluidal PET. In reaction zone 2, an initial temperature is lower than PET Tm and is gradually lowered to reach about 200° C. near the end of reaction zone 2. When the fluidal PET passes through the end of reaction zone 1 and enters reaction zone 2, the Tm of PET is lowered by primary decomposition. The viscosity is lowered due to the above temperature factor and decrease of molecular weight due to primary hydrolysis, so that PET and the mixed slurry may become admixed well by properly controlling the temperature of reaction zone 2 to maintain a shear for mixing. Further, in reaction zone 2, some reaction more proceeds as the two reactants are admixed, however, the reaction is controlled to be completed in reaction zone 3 and reaction zone 4 and the screw should have a structure to improve mixing efficiency.

At the end of reaction zone 2, the temperature of the reactant becomes about 150 to 200° C., and may be adjusted so as to transfer the reactant to the next reaction zone, that is, reaction zone 3.

Reaction zone 3 is a zone where the reaction proceeds primarily. As shown in [Scheme 4] below, PET reacts with metal glycolate whereby most of alkali hydrolysis reaction of PET proceeds therein.

[Scheme 4]

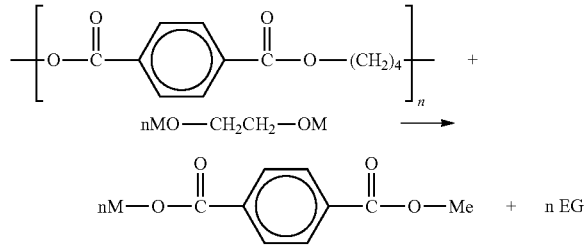

In this regard, the screw used herein may have a pitch interval narrower than the pitch interval of the screw in reaction zone 1, in order to continuously push the reactant forward while maintaining the reaction pressure.

The decomposition reaction of PET is not hindered even when other types of plastics such as polypropylene or polyethylene are mixed, whereas heterogeneous plastic mixtures remain unreacted and thus may be physically removed.

When using NaOH which is the most commonly used alkali, disodium terephthalate and EG are formed as a product, but these are not completely hydrolyzed and becomes a mixture containing oligomeric PET.

Starting of a reaction in reaction zone 3 may be initiated at a temperature of about 150 to 200° C. which is the temperature when passing from reaction zone 2, and then the hydrolysis reaction rate is maximized by increasing the temperature about 20 to 30° C. The temperature is maintained at 180 to 230° C., thus to maintain the melt viscosity, which has been decreased due to a reduction in the molecular weight of PET according to the reaction, and to maintain the vapor pressure of the produced EG as low as possible.

Reaction zone 4 is a zone where the secondary reaction proceeds, and a reaction starts at a temperature of 180 to 230° C., and the reaction rate is maximally increased with a long residence time while lowering the temperature to 180 to 200° C. As a result of the reaction, PET is almost converted into a monomer at the end of reaction zone 4, and the viscosity is very low with a small amount of the remaining oligomer. The temperature is controlled so that the viscosity and pressure are maintained.

Reaction zone 5 is a zone where discharging proceeds, and the temperature is reduced to about 150 to 180° C. Solid products include alkali-metal salts of terephthalic acid (hereinafter referred to as "TPA") as the main component, as well as PET and oligomers that are not completely decomposed, while liquid products include EG and alkali-metal glycolates. These products are discharged in a mixed slurry state. At this time, the discharge temperature is appropriately adjusted to reduce the vapor pressure of EG, which is a liquid product, so that the products are stably discharged without bumping due to the EG vapor pressure. The discharged products are cooled, solidified, and then pulverized into powder.

The product in each process of this reaction is confirmed by a Raman spectrometer. The Raman spectrometer can measure the molecular structure of a solid-state sample without a pretreatment process, whereby a degree of reaction of each product according to the present invention can be directly checked. In addition, a change in the molecular weight of PET is measured by IV, and in order to confirm a mixing performance of the extruder, a degree of Na distribution is determined using SEM-EDX.

The process of the reaction passes through a process of PET-TPA-Na-TPA, and the biggest change in the molecular structure is characterized as follows.

PET has a benzene ring and ester carbonyl C=O as the most representative structure, and as shown in FIG. 3, a benzene ring peak appears at a position of 1601 $cm^{-1}$ while having a large ester peak at a position of 1714 $cm^{-1}$. A size of this peak is decreased as the ester bond of PET is converted into TPA-Na. Using these peaks can determine how much PET is decomposed.

Sodium terephthalate (TPA-Na) is characterized in that the ester structure is decomposed and changed to sodium carboxylate CO—Na. According to such change, the benzene ring peak is present at the same position, but as shown in FIG. 4, the ester peak gradually disappears at 1714 $cm^{-1}$ while the peak of sodium carboxylate is gradually increased at a position of 1123 $cm^{-1}$.

TPA has a carboxylic group-COOH terminal formed by adding acid to sodium terephthalate (TPA-Na) in order to remove Na and attach H, that is, replace Na with H. Therefore, as shown in FIG. 5, a peak of sodium carboxylate at 1123 $cm^{-1}$ is absent while a new peak of carboxylic acid appears at 823 $cm^{-1}$. Further, it is characterized in that the benzene ring peak is also slightly shifted and comes out at a position of 1617 $cm^{-1}$.

Based on this basic Raman spectrum, the compounds obtained in the experimental process are confirmed by comparing with each other.

The present invention will be described in more detail through the following examples. However, the present invention is not limited to the following examples.

Example 1

Preparation of Sodium Terephthalate

Using a twin extruder having 5 reaction zones (temperature control zones), PET bottle pieces with IV=0.83 dl/g were mixed well with NaOH in a ratio by weight of 5% ("5 wt. %"). Then, using a second extruder, a mixed slurry was prepared by mixing 30% NaOH and 5% $Na_2CO_3$ with 15% EG, followed by introducing the same into reaction zone 2 of the extruder, thereby preparing sodium terephthalate.

The twin extruder can adjust the temperature with an electric heater and water cooling, and can also remove generated gas through vacuum. A ratio of a length to a diameter of the screw was 40:1.

At this time, the temperatures of reaction zone 1, reaction zone 2, reaction zone 3, reaction zone 4 and reaction zone 5 were set to 160° C., 180° C., 220° C., 200° C. and 170° C., respectively.

Further, the number of revolutions of the screw was adjusted so that the residence time of PET in the extruder reaches about 10 minutes.

After completion of the reaction, the sodium terephthalate was cooled.

FIG. 6 shows a Raman spectroscopy spectrum of the sodium terephthalate after completion of the reaction, wherein a very large peak appeared at a position of 1123 $cm^{-1}$, and the PET ester peak at a position of 1714 $cm^{-1}$ was significantly reduced to a level shown as traces.

Example 2

Preparation of Terephthalic Acid 100 g of sodium terephthalate obtained in Example 1 was dissolved well in 1 L of pure water while stirring. After about 10 minutes, the aqueous solution was filtered through a filter paper. Solids filtered through the filter paper entered again 1 L of pure water and were dissolved well while stirring again. After 10 minutes, the solution was filtered again through a filter paper and the filtered and undissolved solids were dried and weighed. As a result of weighing, the weight was about 2 g, meaning that the PET-TPA-Naz conversion reaction rate is about 98%. 1 L of secondary filtrate was added to 1 L of primary filtrate. A small amount of hydrochloric acid was mixed with 2 L of the above filtrate and stirred well, followed by measuring acidity (pH) thereof. Until the solution becomes slightly acidic (pH=about 4, 5), hydrochloric acid was added. As a result, white precipitates were precipitated, which in turn were filtered through a filter paper, washed further twice with pure water and dried to prepare terephthalic acid.

Results of measuring the Raman spectroscopy spectrum of the prepared terephthalic acid were shown in FIG. 7.

Example 3

Preparation of Potassium Terephthalate

Under the same conditions as described in Example 1 except that PET bottle pieces with IV=0.83 dl/g and 5 wt. % KOH were mixed well and introduced firstly into a twin extruder, then a mixed slurry was prepared by mixing 35% NaOH and 5% $K_2CO_3$ with 15% EG, followed by secondly introducing the same using a second extruder into the above twin extruder, potassium terephthalate was prepared.

The Raman spectroscopy spectrum of the prepared potassium terephthalate was as shown in FIG. 16. FIG. 16 demonstrated that the Raman spectroscopy spectrum was almost similar to that of the sodium terephthalate, but there is a slight difference in peak intensity ratio.

Example 4

Preparation of Terephthalic Acid 100 g of potassium terephthalate obtained in Example 3 was dissolved well in 1 L of pure water while stirring. After about 10 minutes, the aqueous solution was filtered through a filter paper. Solids filtered through the filter paper entered again 1 L of pure water and were dissolved well while stirring again. After 10 minutes, the solution was filtered again through a filter paper and the filtered and undissolved solids were dried and weighed. As a result of weighing, the weight was about 4 g, meaning that the PET-TPA-$K_2$ conversion reaction rate is about 96%. 1 L of secondary filtrate was added to 1 L of primary filtrate. A small amount of hydrochloric acid was mixed with 2 L of the above filtrate and stirred well, followed by measuring acidity (pH) thereof. Until the solution becomes slightly acidic (pH=about 4, 5), hydrochloric acid was added. As a result, white precipitates were precipitated, which in turn were filtered through a filter paper, washed further twice with pure water and dried to prepare terephthalic acid. Results of measuring the Raman spectroscopy spectrum of the prepared terephthalic acid were shown in FIG. 17, and it could be seen that the dried white solid precipitates were TPA from the result of comparison with the Raman spectroscopy spectrum of the standard TPA of FIG. 5.

Example 5

Experiment 2 to Confirm the Mixing Degree of Alkali Powder Using NaCl

Under the same experimental conditions as in Example 1, 10 wt. % of NaCl powder was mixed with PET, and the mixture was further introduced. The discharged product was cooled to room temperature and hardened and, as a result of measuring SEM-EDS at 500 times, Na (light blue) was finely mixed with C (red) elements derived from PET without large agglomerates. This means that NaCl powders are evenly distributed. Specifically, the above result demonstrated that PET viscosity is smoothly reduced by firstly mixing a small amount of NaOH with PET and secondly introducing the mixture dividedly into two stages to induce a gradual decomposition reaction, therefore, allows the mixing much more homogeneously. This elucidates a reason why the reaction proceeds well and much more uniformly when NaOH is added dividedly rather than at once.

Comparative Example 1

Preparation of Sodium Terephthalate

Using a twin extruder having 5 reaction zones (temperature control zones), PET bottle pieces with IV=0.83 dl/g were reacted with NaOH to prepare sodium terephthalate (TPA-$Na_2$). The twin extruder can adjust the temperature with an electric heater and water cooling, and can also remove generated gas through vacuum. A ratio of a length to a diameter of the screw was 40:1.

NaOH was uniformly mixed with PET bottle pieces until a ratio by weight of NaOH becomes 5% ("5 wt. %"), followed by introducing the mixture into the extruder. At this time, the temperatures of reaction zone 1, reaction zone 2, reaction zone 3, reaction zone 4 and reaction zone 5 were set to 160° C., 180° C., 220° C., 200° C. and 170° C., respectively.

Further, the number of revolutions of the screw was adjusted so that the residence time of PET in the extruder reaches about 10 minutes.

After completion of the reaction, the sodium terephthalate was cooled. As a result of measurement, IV of the prepared sodium terephthalate was 0.51 dl/g, and the Raman spectroscopy spectrum thereof was as shown in FIG. 8. The decrease in IV from 0.83 dl/g to 0.51 dl/g means that the decomposition reaction was in a predetermined level.

Further, in the Raman spectroscopy spectrum of FIG. 8, a small peak occurred at a position of 1123 cm$^{-1}$, indicating that PET was partially decomposed to generate the sodium terephthalate (TPA-Na$_2$).

Comparative Example 2

Preparation of Sodium Terephthalate

Under the same conditions as described in Comparative Example 1 except that PET bottle pieces having IV=0.83 dl/g and 15 wt. % NaOH were mixed and then introduced into the above twin extruder, sodium terephthalate was prepared. The Raman spectroscopy spectrum of sodium terephthalate after completion of the reaction was the same as in FIG. 9. FIG. 9 illustrated that a very large peak appeared at a position of 1123 cm$^{-1}$ and the PET ester peak at a position of 1714 cm$^{-1}$ was reduced by almost half and became smaller than that at 1123 cm$^{-1}$. Further, it could be seen that the peak at 1123 cm$^{-1}$ representing an amount of sodium terephthalate (TPA-Na$_2$) has intensity about 1.2 times higher than that of the other peaks.

Comparative Example 3

Preparation of Sodium Terephthalate

Under the same conditions as described in Comparative Example 1 except that PET bottle pieces having IV=0.83 dl/g and 30 wt. % NaOH were mixed and then introduced into the twin extruder, sodium terephthalate was prepared. The Raman spectroscopy spectrum of sodium terephthalate after completion of the reaction was the same as in FIG. 10. FIG. 10 illustrated that a very large peak appeared at a position of 1123 cm$^{-1}$ and the PET ester peak at a position of 1714 cm$^{-1}$ was considerably reduced thus to have lower intensity almost 1/16 of the peak at 1123 cm$^{-1}$.

Comparative Example 4

Preparation of Sodium Terephthalate

Under the same conditions as described in Comparative Example 1 except that PET bottle pieces having IV=0.83 dl/g and 5 wt. % NaOH were mixed and then introduced firstly into the twin extruder, then a mixed slurry was prepared by mixing 30% NaOH with 15% EG, followed by secondly introducing the same using a second extruder into the above twin extruder, sodium terephthalate was prepared.

The Raman spectroscopy spectrum of sodium terephthalate after completion of the reaction was the same as in FIG. 11. FIG. 11 illustrated that a very large peak appeared at a position of 1123 cm$^{-1}$ and the PET ester peak at a position of 1714 cm$^{-1}$ was considerably reduced thus to have lower intensity almost 1/18 of the peak at 1123 cm$^{-1}$. However, it could be seen that PET not decomposed is still present.

Comparative Example 5

Preparation of Terephthalic Acid 100 g of sodium terephthalate obtained in Comparative Example 4 was dissolved well in 1 L of pure water while stirring. After about 10 minutes, the aqueous solution was filtered through a filter paper. Solids filtered through the filter paper entered again 1 L of pure water and were dissolved well while stirring again. After 10 minutes, the solution was filtered again through a filter paper and the filtered and undissolved solids were dried and weighed. As a result of weighing, the weight was 13 g, meaning that the PET-TPA-Na$_2$ conversion reaction rate is about 87%. 1 L of secondary filtrate was added to 1 L of primary filtrate. A small amount of hydrochloric acid was mixed with 2 L of the above filtrate and stirred well, followed by measuring acidity (pH) thereof. Until the solution becomes slightly acidic (pH=about 4, 5), hydrochloric acid was added. As a result, white precipitates were precipitated, which in turn were filtered through a filter paper, washed further twice with pure water and dried to prepare terephthalic acid. Results of measuring the Raman spectroscopy spectrum of the prepared terephthalic acid were shown in FIG. 12, and it could be seen that the dried white solid precipitates were TPA from the result of comparison with the Raman spectroscopy spectrum of the standard TPA of FIG. 5.

Comparative Example 6

Preparation of Sodium Terephthalate Using Ethanol as Solvent

A stirrer, a thermometer and a reflux cooler were mounted on a 1 liter 4-neck round bottom flask, and the flask was installed in a heating mantle. Then, 100 g of PET bottle pieces with IV=0.83 dl/g, 30 ml of ethylene glycol sodium salt, 40 g of sodium hydroxide and 600 ml of ethanol were put in the flask. A temperature of the heating mantle was raised until the ethanol is boiled, and the stirrer was operated to reflux, followed by a reaction for about 10 hours. After the reaction, the reacted solution was filtered through a 100 mesh sieve in order to filter out unreacted residual PET bottle pieces and the bottle pieces were wiped with 100 ml of pure ethanol. As a result of weighing the filtered and unreacted substances after drying, it was 23 g. This result demonstrates that the high polymerization degree PET having an intrinsic viscosity of 0.75 dl/g or more has a decomposition reaction rate of only about 77%.

The reacted emulsion type solution containing white precipitates, from which the unreacted PET bottle pieces have been removed, was filtered through a paper filter to obtain the white precipitates. The obtained white precipitates were washed 3 times with methanol and dried to prepare sodium terephthalate.

The obtained sodium terephthalate was dissolved well in water, and results of measuring the spectrum by the Raman spectrometer were as shown in FIG. 13. As a result of comparing the above measured spectrum with the Raman spectroscopy spectrum of the standard sodium terephthalate of FIG. 4, it was confirmed that the component was the sodium terephthalate.

Comparative Example 7

Preparation of Sodium Terephthalate Using Ethanol as Solvent

A stirrer, a thermometer and a reflux cooler were mounted on a 1 liter 4-neck round bottom flask, and the flask was installed in a heating mantle. Then, 100 g of bright PET cloth pieces cut into small pieces with IV=0.55 dl/g, 30 ml of ethylene glycol sodium salt, 40 g of sodium hydroxide and 600 ml of ethanol were put in the flask. A temperature of the heating mantle was raised until the ethanol is boiled, and the stirrer was operated to reflux, followed by a reaction for about 1 hour. After the reaction, the reacted solution was filtered through a 100 mesh sieve in order to filter out unreacted residual PET bottle pieces and the PET bottle pieces were wiped with 100 ml of pure ethanol. There were no filtered and unreacted substances. This means that moderate and low polymerization degree PET has a decomposition reaction rate of almost 100%, thereby being decomposed well.

The reacted emulsion type solution containing white precipitates, from which the unreacted substances have been removed, was filtered through a paper filter to obtain the white precipitates. The obtained white precipitates were washed 3 times with methanol and dried to prepare sodium terephthalate.

The obtained sodium terephthalate was dissolved well in water, and results of measuring the spectrum by the Raman spectrometer were as shown in FIG. 14. As a result of comparing the above measured spectrum with the Raman spectroscopy spectrum of the standard sodium terephthalate of FIG. 4, it was confirmed that the component was the sodium terephthalate.

Comparative Example 8

Preparation of Terephthalic Acid 100 g of sodium terephthalate obtained in Comparative Example 7 was put in a 2 liter beaker, and 1.5 litter of distilled water was added thereto, followed by stirring to completely dissolve the same. Then, hydrochloric acid was gradually added while stirring well to obtain a slightly acidic solution (about pH 4, 5). As a result, white precipitates were precipitated, which in turn were filtered through a filter paper, collected and then dried to prepare terephthalic acid.

Results of measuring the Raman spectroscopy spectrum of the prepared terephthalic acid were shown in FIG. 15. As a result of comparing the above measured result with the Raman spectroscopy spectrum of the standard product of FIG. 5, it could be confirmed that the component was terephthalic acid.

Comparative Example 9

Experiment to Confirm the Mixing Level of Alkali Powder Using NaCl

Under the same reaction conditions as described in Comparative Example 3, about 10 wt. % of NaCl powder was mixed with PET, and the mixture was further introduced. After cooling the discharged product to room temperature to solidify the same, the product was subjected to SEM-EDS measurement at 500 times. As a result of the measurement, as shown in FIG. 18, it was obtained a photograph showing that Na (green) derived from NaCl was very little mixed with C (red) elements derived from PET and large agglomerates were included. This is because the decomposition reaction occurred too rapidly when a large amount of NaOH was introduced at once, resulting in a large difference in PET viscosity by position as well as irregular change. These results could be confirmed by irregular distribution of NaCl powder. Eventually, it could be seen that, when NaOH is introduced at once under operating conditions of the twin extruder used in the experiments, this is not mixed well during the mixing process.

What is claimed is:

1. A method for production of terephthalic acid using a high polymerization degree polyethylene terephthalate having an intrinsic viscosity of 0.75 dl/g or more, the method comprising:
   (i) introducing polyethylene terephthalate (PET) having a polymerization degree of 0.75 dl/g or more into a continuous reactor in the form of an extruder, and then heating and pressurizing the same to prepare a fluidal polyethylene terephthalate;
   (ii) introducing a mixed slurry prepared by mixing an alkaline material (abbrev. to "alkali") containing an alkali-metal, a weak acid salt of the alkali-metal and ethylene glycol together into an internal position of the continuous reactor, through which the fluidal polyethylene terephthalate passes, and implementing neat reaction of the fluidal polyethylene terephthalate with the mixed slurry in the continuous reactor to prepare alkali-metal terephthalate; and
   (iii) dissolving the prepared alkali-metal terephthalate in water, removing foreign substances through filtration and centrifugation, adding acid to the alkali-metal terephthalate dissolved in water and reacting the same, thereby producing terephthalic acid.

2. The method according to claim 1, wherein the mixed slurry is introduced dividedly into stages 1 to 5 at different positions of the continuous reactor, through which the fluidal polyethylene terephthalate passes.

3. The method according to claim 1, wherein the polyethylene terephthalate having a polymerization degree of 0.75 dl/g or more is one selected from a homo-polymer and a copolymerized polymer (copolymer).

4. The method according to claim 1, wherein, when the polyethylene terephthalate having a polymerization degree of 0.75 dl/g or more is introduced into an extruder type continuous reactor, alkali containing an alkali-metal is introduced along with the same.

5. The method according to claim 4, wherein a content of alkali containing an alkali-metal, which is introduced into the continuous reactor together with the polyethylene terephthalate having a polymerization degree of 0.75 dl/g or more, is adjusted to be 5 to 10% in a ratio by weight with respect to the polyethylene terephthalate.

6. The method according to claim 1, wherein alkali-metals to form the alkali containing an alkali-metal and the weak acid salt of the alkali-metal are one selected from lithium (Li), sodium (Na) and potassium (K).

7. The method according to claim 1, wherein the weak acid salt of the alkali-metal is one selected from a salt produced by a reaction of the alkali-metal and carbonic acid ($H_2CO_3$), a salt produced by a reaction of the alkali-metal and phosphoric acid ($H_3PO_4$), a salt produced by a reaction of the alkali-metal and acetic acid, and a salt produced by a reaction of the alkali-metal and formic acid.

* * * * *